(12) United States Patent
Sakata et al.

(10) Patent No.: US 7,954,316 B2
(45) Date of Patent: Jun. 7, 2011

(54) HYDROSTATIC STEPLESS TRANSMISSION

(75) Inventors: Koji Sakata, Amagasaki (JP); Yasuhisa Mochizuki, Amagasaki (JP)

(73) Assignee: Yanmar Co., Ltd., Osaka (JP)

( * ) Notice: Subject to any disclaimer, the term of this patent is extended or adjusted under 35 U.S.C. 154(b) by 388 days.

(21) Appl. No.: 11/617,172

(22) Filed: Dec. 28, 2006

(65) Prior Publication Data
US 2008/0155979 A1 Jul. 3, 2008

(51) Int. Cl.
*F16D 31/02* (2006.01)
(52) U.S. Cl. .......................................... 60/445; 60/468
(58) Field of Classification Search .................... 60/445, 60/489
See application file for complete search history.

(56) References Cited

U.S. PATENT DOCUMENTS

| | | | | |
|---|---|---|---|---|
| 3,166,905 | A | * | 1/1965 | Budzich et al. ................. 60/489 |
| 4,756,157 | A | * | 7/1988 | Appel ............................. 60/452 |
| 5,850,736 | A | * | 12/1998 | Sakakura et al. .............. 60/488 |
| 6,286,309 | B1 | * | 9/2001 | Horton et al. .................. 60/468 |

FOREIGN PATENT DOCUMENTS

JP 2004-011769 A 1/2004
* cited by examiner

*Primary Examiner* — F. Daniel Lopez
(74) *Attorney, Agent, or Firm* — Sterne, Kessler, Goldstein & Fox P.L.L.C.

(57) ABSTRACT

A hydrostatic stepless transmission comprises: a hydraulic pump; a hydraulic motor, wherein at least one of the hydraulic pump and motor is variable in displacement, and is provided with a movable swash plate; a closed circuit connecting the hydraulic pump and motor to each other through a pair of main fluid passages, wherein one main fluid passage is higher-pressurized during forward traveling, and wherein the other main fluid passage is higher-pressurized during backward traveling; a hydraulic servomechanism for controlling a tilt angle of the movable swash plate of the at least one of the hydraulic pump and motor; a speed-controlling motive member attached to the hydraulic servomechanism, wherein the speed-controlling motive member interlocks with the movable swash plate and is moved by operating a speed control operation lever; and a load controlling system attached to the hydraulic servomechanism. The load controlling system includes an actuator for moving the speed-controlling motive member in a direction for deceleration, and a pair of check valves connected to the respective main fluid passages. Fluid is led from either of the main fluid passages to the actuator through the corresponding check valve so as to serve as an element for detecting load and as hydraulic pressure fluid for actuating the actuator.

10 Claims, 17 Drawing Sheets

HYDROSTATIC STEPLESS TRANSMISSION

BACKGROUND OF THE INVENTION

1. Field of the Invention

The present invention relates to a hydrostatic stepless transmission including a hydraulic pump and a hydraulic motor, in which an angle/angles of a movable swash plate/plates of the hydraulic pump or/and motor is/are controlled.

2. Related Art

Conventionally, there is a well-known hydrostatic stepless transmission (hereinafter referred to as "HST") including a hydraulic pump and a hydraulic motor, with a hydraulic servomechanism for controlling a tilt angle/angles of a movable swash plate/plates of the variable displacement hydraulic pump or/and motor. One conventional hydraulic servomechanism is an automotive type having an electromagnetic valve/valves connected to the hydraulic pump or the HST so as to automatically tilt the movable swash plate/plates in proportion to increase of the rotary speed of the hydraulic pump. Another conventional hydraulic servomechanism is a manual servomechanism for controlling the movable swash plate of the hydraulic pump by operating a speed control operation lever provided outside the HST.

As disclosed in JP 2004-11769 A, an HST of this conventional type is provided with a load controlling system such that a working vehicle is decelerated when load on an engine is equal to or exceeds a threshold value, and the working vehicle is accelerated when the load is equal to or lower than a threshold value.

With respect to the load controlling system with the HST, more specifically, the movable swash plate of the hydraulic pump or motor is tilted in the direction for decelerating the vehicle so as to prevent load on the engine from exceeding the threshold value, thereby preventing the engine from stalling. In this regard, with respect to an HST-controlled working vehicle, such as a tractor equipped with a backhoe and a loader, when a speed control operation device is operated for accelerating the vehicle at work, the output rotary speed of the HST is increased, however, the engine torque is reduced and the engine may stall in the worst case. Therefore, load on an engine is detected so that, when the engine is recognized to be overloaded, the HST speed control operation device is operated for decelerating the vehicle so as to prevent the engine from stalling.

With respect to this load controlling system with HST, to accurately control the tilt angle/angles of the movable swash plate/plates of the hydraulic pump or/and motor, it is noticed that variation of hydraulic pressure in a main fluid passage of the closed circuit of the HST connecting the hydraulic pump and motor to each other is regarded as the variation of load on the engine. Namely, this load controlling system controls the hydraulic servomechanism for controlling the displacement or displacements of the hydraulic pump or/and motor so as to decelerate the vehicle by an actuator driven by hydraulic pressure fluid led from the main fluid passage regarded as load on the engine.

SUMMARY OF THE INVENTION

Some problems exist in the configuration for leading the hydraulic pressure fluid from the main fluid passage of the closed circuit, connecting the hydraulic pump and motor, to the actuator (of the load controlling system) for controlling the hydraulic servomechanism for decelerating the vehicle.

Description will now be given of the problems, objects of the invention for solving the problems, and aspects of the invention for achieving the objects.

A first problem exists in that the hydraulic pressure fluid led from the main fluid passage has to be prevented from flowing backward to the main fluid passage so as to reduce the accuracy of control and the efficiency of the HST. Further, the closed circuit between the hydraulic pump and motor includes a pair of main fluid passages. One main fluid passage is higher-pressurized when the vehicle travels forward, i.e., when the HST is rotated in the direction for forward traveling of the vehicle. The other main fluid passage is higher-pressurized when the vehicle travels backward, i.e., when the HST is rotated in the direction for backward traveling of the vehicle. If only one of the main fluid passages is decided as a source from which the hydraulic pressure fluid is led to the load controlling system, the load control with the HST cannot be performed only during either forward or backward traveling of the vehicle. Generally, only the forward traveling of the vehicle is decided to be controlled by the load controlling system. However, it is preferred that the backward traveling is also controlled by the load controlling system so as to smoothen work by the vehicle and traveling of the vehicle.

If the HST is configured so that the load control is applicable regardless of whether the vehicle travels forward or backward, the following problem arises when the threshold load on the engine for deciding whether or not the HST speed control device is operated for deceleration is constant regardless of whether the vehicle travels forward or backward.

There is a conventional transmission including an HST, such as an HMT (hydro-mechanical transmission) including an HST and a planetary gear mechanism, in which an output torque (tractive effort) of the HST corresponding to a tilt angle of the movable swash plate during forward traveling is different from that corresponding to the same tilt angle of the movable swash plate during backward traveling (in the opposite rotational direction of the movable swash plate), more specifically, the tractive effort during backward traveling is smaller than that during forward traveling. In this condition, it is supposed that the load controlling system corresponds to the load on engine during one of forward traveling and backward traveling. During the other backward or forward traveling, the vehicle is speed-controlled based on the load on engine before the hydraulic pressure reaches a proper value corresponding to the load on engine requiring the load control, thereby insufficiently using power of the engine, or otherwise, the vehicle is not speed-controlled based on the load on engine even when the hydraulic pressure arises to a value requiring the speed control, thereby stalling the engine.

A first object of the invention is to provide a hydrostatic stepless transmission accurately speed-controlled based on load on an engine without reduction of the efficiency of the HST regardless of whether a working vehicle travels forward or backward. Further, the hydrostatic stepless transmission has to be speed-controlled based on load on an engine to ensure a sufficient tractive effort regardless of whether the vehicle travels forward or backward.

To achieve the first object, according to a first aspect of the invention, a hydrostatic stepless transmission comprises: a hydraulic pump; a hydraulic motor, wherein at least one of the hydraulic pump and motor is variable in displacement, and is provided with a movable swash plate; a closed circuit connecting the hydraulic pump and motor to each other through a pair of main fluid passages, wherein one main fluid passage is higher-pressurized during forward traveling, and wherein the other main fluid passage is higher-pressurized during backward traveling; a hydraulic servomechanism for controlling a tilt angle of the movable swash plate of the at least one of the hydraulic pump and motor; a speed-controlling motive member attached to the hydraulic servomechanism, wherein the speed-controlling motive member interlocks with the movable swash plate and is moved by operating a speed control operation lever; and a load controlling system attached to the hydraulic servomechanism. The load controlling system includes an actuator for moving the speed-controlling motive member in a direction for deceleration, and a pair of check valves connected to the respective main fluid passages. Fluid is led from either of the main fluid passages to the actuator through the corresponding check valve so as to serve as an element for detecting load and as hydraulic pressure fluid for actuating the actuator.

An effect of the first aspect is that fluid to be extracted for the load control is prevented from backflowing to the main fluid passage, and the load controlling system can perform the load control regardless of whether a vehicle travels forward or backward. Due to the load control, an engine is prevented from stalling whether the vehicle travels forward or backward, thereby ensuring working vehicles to work and travel smoothly. Further, since the main fluid passages are provided with the respective check valves to lead fluid to the load controlling system, fluid to be led to the load controlling system is prevented from backflowing to the main fluid passage or is prevented from flowing between the higher-pressurized and lower-pressurized main fluid passages, thereby eliminating instability of hydraulic pressure in the main fluid passages. Therefore, the load control is accurately performed without reducing the efficiency of the HST.

Preferably, in the first aspect, pressures required for opening the respective check valves are different from each other. Accordingly, the load control can be performed at an optimal timing whether the vehicle travels forward or backward. Therefore, the load control can easily correspond to an apparatus (such as an HMT), whose output torque depending on a tilt angle of the movable swash plate in the tilt direction for forward traveling is different from its output torque depending of the same tilt angle of the movable swash plate in the tilt direction for backward traveling. Consequently, whether the vehicle travels forward or backward, the engine can be prevented from stalling when it is overloaded, and an engine power can be effectively used so as to ensure a sufficient tractive effort.

Further preferably, at least one of the check valves is provided with an elastic member for determining the pressure required for opening the corresponding check valve. Therefore, a threshold hydraulic pressure in the higher-pressurized main fluid passage for starting the load control can be easily determined.

A second problem exists in follows. In a conventional structure, an external pipe is connected through a joint or the like to an outward opening of the main fluid passage, e.g., an opening formed in a duct plate (center section), on which a hydraulic pump of an HST is mounted, so as to extract fluid from the main fluid passage through the pipe. To lead fluid from the main fluid passage to the load controlling system through the external pipe, if the structure having the pipe connected to the opening of the main fluid passage is additionally provided with a check valve or another means for preventing fluid from backflowing to the main fluid passage, the structure is complicated so as to increase the number of parts and costs. Further such an additional member has to be disposed so as to be prevented from interfering with another pipe of the HST, or to ensure a space for pipes of another structure.

A second object of the invention is to provide a hydrostatic stepless transmission controlling load by using pressure fluid in main fluid passages connecting hydraulic pump and motor to each other, wherein the hydrostatic stepless transmission has a simple and inexpensive structure for leading pressure fluid from the main fluid passage to the load controlling system so as to ensure stable load control without reducing the efficiency of HST, and to easily ensure a space for pipes prevented from interfering with each other.

To achieve the second object, according to a second aspect of the invention, a hydrostatic stepless transmission comprises: a hydraulic pump; a hydraulic motor, wherein at least one of the hydraulic pump and motor is variable in displacement, and is provided with a movable swash plate; a closed circuit connecting the hydraulic pump and motor to each other through a pair of main fluid passages, wherein one main fluid passage is higher-pressurized during forward traveling, and wherein the other main fluid passage is higher-pressurized during backward traveling; a pair of plugs serving as a pair of relief valves for determining respective maximum pressures in the respective main fluid passages; a hydraulic servomechanism for controlling a tilt angle of the movable swash plate of the at least one of the hydraulic pump and motor; a speed-controlling motive member attached to the hydraulic servomechanism, wherein the speed-controlling motive member interlocks with the movable swash plate and is moved by operating a speed control operation lever; and a load controlling system attached to the speed-controlling motive member. The load controlling system includes an actuator for moving the speed-controlling motive member in a direction for deceleration, and a pair of check valves disposed within the respective plugs so as to be connected to the respective main fluid passages. Fluid is led from either of the main fluid passages to the actuator through the corresponding check valve so as to serve as an element for detecting load and as hydraulic pressure fluid for actuating the actuator.

An effect of the second aspect is as follows. To lead fluid from either of the main fluid passages to the load controlling system, the apparatus of the second aspect is a simple and inexpensive apparatus, which can stably control load without reducing the efficiency of HST, and can easily ensure a space for pipes prevented from interfering with each other. Further, since the main fluid passages are provided with the respective check valves to lead fluid to the load controlling system, fluid to be led to the load controlling system is prevented from backflowing to the main fluid passage or is prevented from flowing between the higher-pressurized and lower-pressurized main fluid passages, thereby eliminating instability of hydraulic pressure in the main fluid passages. Therefore, the load control is accurately performed without reducing the efficiency of HST.

A third problem exists in that pulsation of hydraulic pressure in the main fluid passages is increased while the working vehicle is working. Accordingly, in the load controlling system acting by hydraulic pressure led from the main fluid passage, hunting is generated in the mechanical action by hydraulic pressure so as to make the load control unstable. If an actuator acting by hydraulic pressure from the main fluid passage is minimized according to minimization of the load controlling system for minimizing the HST, this phenomenon is supposed to be remarkable because the actuator is greatly influenced by the variation of hydraulic pressure in the main fluid passage 13.

Thus, in the load controlling system, operation fluid in a charge fluid passage is used for providing counter pressure against the hydraulic pressure from the main fluid passage so as to optimize a timing of load control, thereby preventing the load controlling system from hunting. However, if the counter pressure is insufficient, the hunting is not effectively prevented. That is, if the counter pressure against the hydraulic pressure from the main fluid passage is small, the influence of the pulsation of hydraulic pressure in the main fluid passage to the load controlling system is increased so as to cause hunting. Particularly, when the working vehicle travels fast, the hunting in the load controlling system is undesirable because the tilt angle change of the movable swash plate of the HST greatly influences the traveling speed even if the tilt angle change is slight.

Further, if the counter pressure is small, the action of the load controlling system by increasing hydraulic pressure in the main fluid passage is violent so as to hurry the deceleration by the load control. It is disadvantageous in safety and driver's feeling.

A third object of the invention is to provide a hydrostatic stepless transmission, which ensures smooth and stable load control by using hydraulic pressure from a main fluid passage connecting hydraulic pump and motor to each other, and which ensures sufficient counter pressure against the hydraulic pressure from the main fluid passage by using pressure fluid in a charge fluid passage so as to prevent a load controlling system from hunting, thereby ensuring smooth and stable load control.

To achieve the third object, according to a third aspect of the invention, a hydrostatic stepless transmission comprises: a hydraulic pump; a hydraulic motor, wherein at least one of the hydraulic pump and motor is variable in displacement, and is provided with a movable swash plate; a closed circuit including a main fluid passage so as to connect the hydraulic pump and motor to each other; a hydraulic servomechanism for controlling a tilt angle of the movable swash plate of the at least one of the hydraulic pump and motor; a speed-controlling motive member attached to the hydraulic servomechanism, wherein the speed-controlling motive member interlocks with the movable swash plate and is moved by operating a speed control operation lever; and a load controlling system attached to the hydraulic servomechanism. The load controlling system includes an actuator, a cylinder, a spool, a counter pressure chamber, and a throttle. The actuator is provided for moving the speed-controlling motive member in a direction for deceleration. Fluid is led from the main fluid passage to the actuator so as to serve as an element for detecting load and as hydraulic pressure fluid for actuating the actuator. The spool is slidably fitted in the cylinder and engages with the speed-controlling motive member. The cylinder is fluidly connected therein on one side of the spool to the main fluid passage, so that, when the load control is required, the spool is pushed by hydraulic pressure fluid from the main fluid passage so as to move the speed-controlling motive member, thereby controlling a tilt angle of the movable swash plate independently of the tilt angle control of the movable swash plate by operating the speed controlling operation lever. The counter pressure chamber is disposed in the cylinder on the other side of the spool so as to be supplied with hydraulic pressure fluid for pressing the spool against the hydraulic pressure fluid from the main fluid passage. The throttle is disposed adjacent to the counter pressure chamber and is opened to the counter pressure chamber.

An effect of the third aspect is sufficient counter pressure supplied to the load controlling system, so as to moderate the motion of the spool for the load control, thereby preventing the load controlling system from hunting, and ensuring smooth and stable load control.

Preferably, in the third aspect, at a position where the spool of the load controlling system for the hydraulic motor is adapted to engage with the speed-controlling motive member, unless the spool is slid in the direction for deceleration, the spool has a space from the speed-controlling motive member disposed at a position for establishing a maximum speed. Therefore, when the hydraulic pressure in the main fluid passage is increased to slide the spool, the spool has to slide to some degree (corresponding to the space from the speed-controlling motive member) before the spool engages with the speed-controlling motive member. Consequently, the slide of the spool for the load control is further moderated so as to further smoothen and stabilize the load control.

Further preferably, the spool is provided with a seal for holding fluid tightness between the spool and the cylinder. Therefore, when the spool slides in the direction for deceleration, the operating fluid in the chamber of the cylinder is led into the throttle without leak, so as to improve the counter pressure effect of the throttle, and to surely moderate the motion of the spool for the load control, thereby smoothening and stabilizing the load control.

A fourth problem exists in that operating fluid is led from a charge fluid passage of an HST to a hydraulic servomechanism for controlling a tilt angle of a movable swash plate provided in the HST, thereby speed-controlling the HST. The charge fluid passage is provided for supplying operating fluid to the main fluid passages and others. If the pressure fluid from the charge fluid passage led to the hydraulic servomechanism is not controlled, and if the hydraulic servomechanism is manually controlled as mentioned above, the following problems are supposed to arise. The hydraulic servomechanism is controlled by operating a speed controlling operation device such as a speed control lever. When a large amount of fluid is supplied through a fluid passage to a swash plate control angle valve constituting the hydraulic servomechanism, pulsation is generated in the fluid passage, so that the response of the hydraulic servomechanism to the operation of the speed controlling operation device becomes sudden so as to cause sudden start or stop of the vehicle. In this way, the speed control is unstable.

On the other hand, the operating fluid in the charge fluid passage is also used for ensuring counter pressure in the load controlling system against the hydraulic pressure fluid supplied from the main fluid passage, so as to optimize a timing of the load control. In this situation, if a valve for limiting the flow amount of fluid led from the charge fluid passage is provided so as to moderate the motion of the hydraulic servomechanism and to stabilize the speed control, the load controlling system is supplied with insufficient counter pressure, thereby causing the load control before the hydraulic pressure in the main fluid passage becomes high enough to require the load control. On the contrary, when pressure fluid is supplied from the charge fluid passage for ensuring sufficient counter pressure of the load controlling system, the pressure fluid from the charge fluid passage is also led to the hydraulic servomechanism so as to cause the above-mentioned unstable and unsafe speed control.

Further, if both of the hydraulic pump and motor are variable in displacement and have respective hydraulic servomechanisms, the flow amount of fluid has to correspond to the respective hydraulic servomechanisms receiving the fluid.

A fourth object of the invention is to provide a hydrostatic stepless transmission having variable displacement hydraulic pump and motor and performing the load control by use of pressure fluid from a main fluid passage interposed between the hydraulic pump and motor, improved in stabilization of the movable swash plate control by a hydraulic servomechanism, and in optimization of the load control with a load controlling system.

To achieve the fourth object, according to a fourth aspect of the invention, a hydrostatic stepless transmission comprises: variable displacement hydraulic pump and motor provided with respective movable swash plates; a closed circuit including a main fluid passage so as to connect the hydraulic pump and motor to each other; a charge fluid passage; hydraulic servomechanisms for controlling tilt angles of the movable swash plates of the respective hydraulic pump and motor, the hydraulic servomechanisms including respective swash plate angle control valves; speed-controlling motive members attached to the respective hydraulic servomechanisms, wherein each of the speed-controlling motive members interlocks with the corresponding movable swash plate and is moved by operating a speed control operation lever; and load controlling systems attached to the respective hydraulic servomechanisms. Each of the load controlling systems includes an actuator for moving the speed-controlling motive member in a direction for deceleration. Fluid is led from either of the main fluid passages to the actuator so as to serve as an element for detecting load and as hydraulic pressure fluid for actuating the actuator. The hydrostatic stepless transmission further comprises: a second fluid passage for leading charged pressure fluid from the charge fluid passage to the hydraulic servomechanisms for the respective hydraulic pump and motor; and flow-determining valves for limiting flow amounts of fluid to the respective swash plate angle control valves of the hydraulic servomechanisms. The flow-determining valves are disposed on portions of the second fluid passage where the flow-determining valves are prevented from limiting the amounts of charged pressure fluid supplied to the counter pressure chambers of the load controlling systems.

An effect of the fourth aspect is that the movable swash plate control by the hydraulic servomechanisms is stabilized, and the accuracy of the load control with the load controlling systems is improved.

A fifth problem exists in that, when hydraulic pressure in the main fluid passage pulsates, the pulsation influences the load control, so as to reduce the accuracy of load control. In other words, the load controlling system has the actuator actuated by hydraulic pressure from the main fluid passage, and if the hydraulic pressure in the main fluid passage pulsates, the timing for actuating the actuator of the load controlling system is unexpectedly shifted, or the actuation is unstable, so that the load control does not surely react against the hydraulic pressure in the main fluid passage corresponding to engine load.

A fifth object of the invention is to provide a hydrostatic stepless transmission having hydraulic pump and motor, wherein pressure fluid in a main fluid passage interposed between the hydraulic pump and motor is used for the load control, improved in prevention of pulsation of hydraulic pressure in the main fluid passage and in accuracy of the load control.

To achieve the fifth object, according to a fifth aspect of the invention, a hydrostatic stepless transmission comprises: a hydraulic pump; a hydraulic motor, wherein at least one of the hydraulic pump and motor is variable in displacement, and is provided with a movable swash plate; a closed circuit connecting the hydraulic pump and motor to each other through a pair of main fluid passages, wherein one main fluid passage is higher-pressurized during forward traveling, and wherein the other main fluid passage is higher-pressurized during backward traveling; a hydraulic servomechanism for controlling a tilt angle of the movable swash plate of the at least one of the hydraulic pump and motor; a speed-controlling motive member attached to the hydraulic servomechanism, wherein the speed-controlling motive member interlocks with the movable swash plate and is moved by operating a speed control operation lever; and a load controlling system attached to the hydraulic servomechanism. The load controlling system includes an actuator for moving the speed-controlling motive member in a direction for deceleration. Fluid is led from either of the main fluid passages to the actuator so as to serve as an element for detecting load and as hydraulic pressure fluid for actuating the actuator. The hydrostatic stepless transmission further comprises a throttle through which a part of pressure fluid flowing in the higher-pressurized main fluid passage in the closed circuit is drained to an area pressurized lower than the higher-pressurized main fluid passage during the load control with the load controlling system.

An effect of the fifth aspect is prevention of pulsation of hydraulic pressure in the main fluid passage and accuracy of the load control.

Preferably, in the fifth aspect, the hydrostatic stepless transmission further comprises: a charge fluid passage; and a charge check valve interposed between the charge fluid passage and each of the main fluid passages. The charge fluid passage serves as the area pressurized lower than the higher-pressurized main fluid passage. The throttle penetrates the charge check valve. Therefore, the throttle is constituted with no additional throttling device disposed in the main fluid passage, for example, thereby preventing increase of components in number. Further, since the charge fluid passage serves as the lower-pressurized area into which fluid is released from the higher-pressurized main fluid passage, the load control is smoothened with no additional device for fluid supply.

Further preferably, the throttle is closed before hydraulic pressure in the main fluid passage is increased to a level requiring the load control with the load controlling system. Therefore, the hydraulic pressure transmission efficiency from the hydraulic pump to the hydraulic motor through the main fluid passage is improved so as to enhance the volumetric efficiency of the HST.

These, further and other objects, features and advantages will appear more fully from the following description with reference to accompanying drawings.

DETAILED DESCRIPTION OF THE INVENTION

An embodiment of the invention will be described. A hydrostatic stepless transmission (HST) according to the invention is applicable to working vehicles, such as an agricultural working vehicle, e.g., a tractor, and a working vehicle equipped with a loader. The following description will be given of an HST provided to a working vehicle equipped with a loader.

Figure 1:
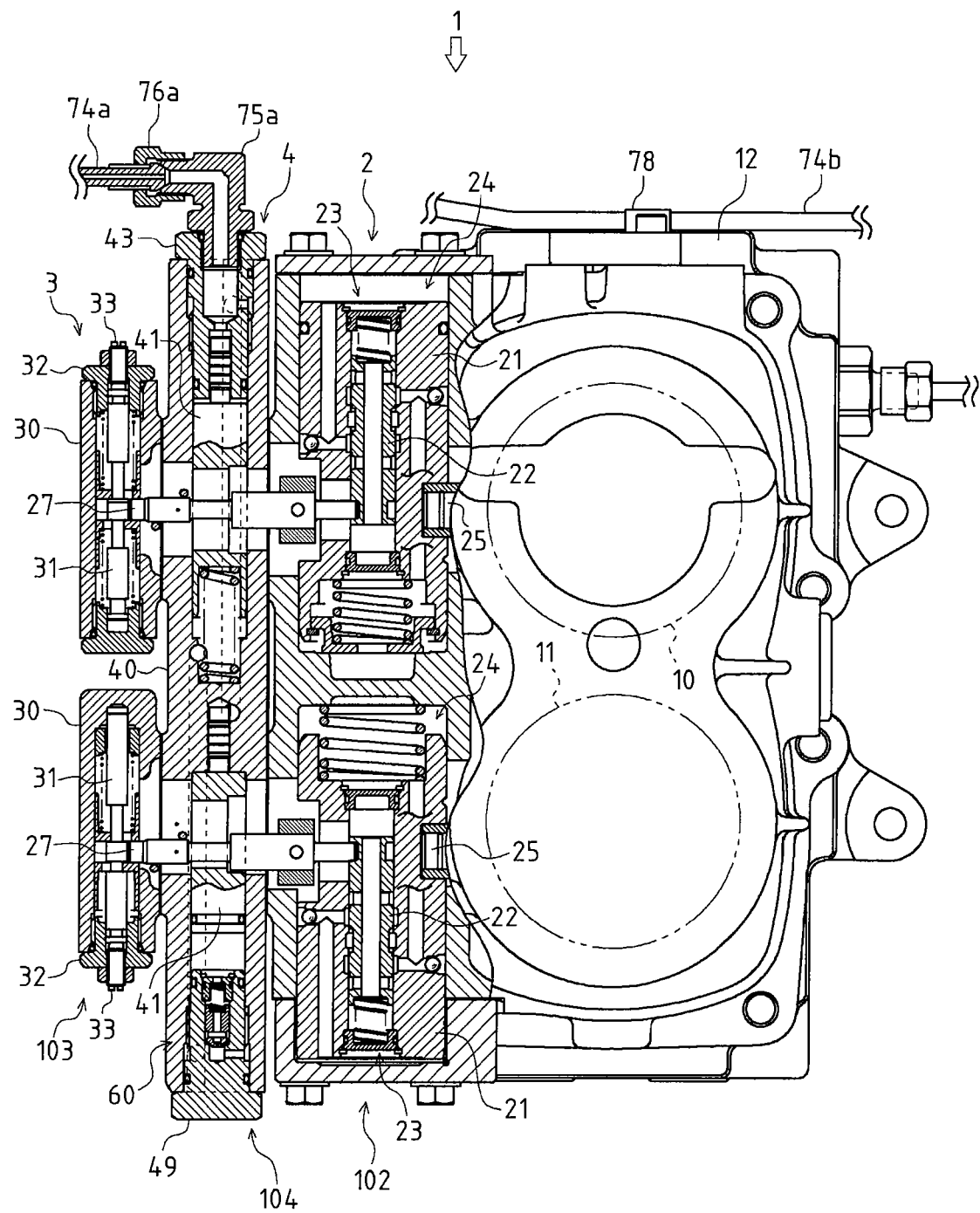
FIG. 1 is a front view partly in section of an entire structure of an HST according to the invention.
Figure 2:
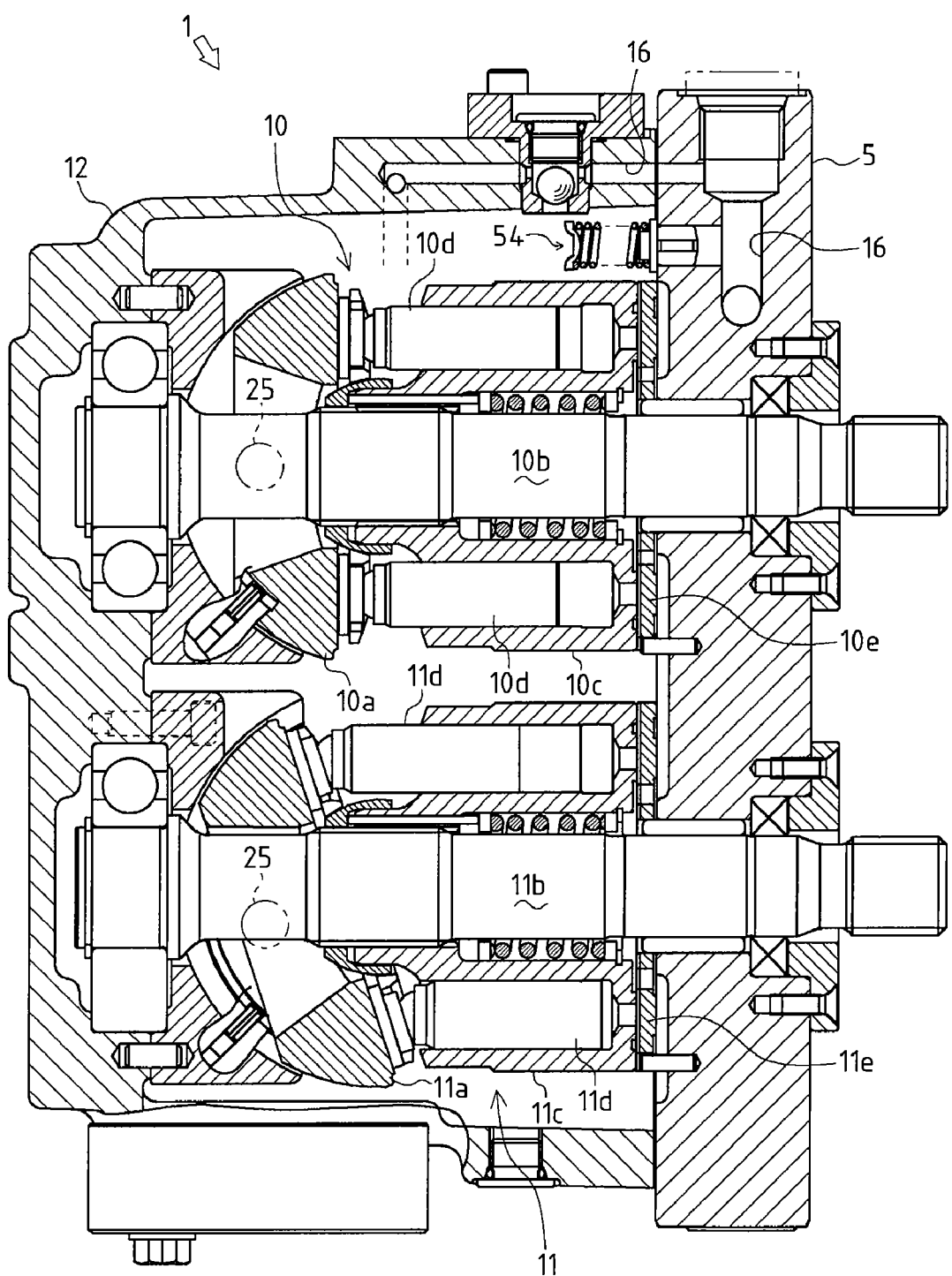
FIG. 2 is a sectional side view of the HST.

An entire configuration of an HST 1 according to the invention will be described with reference to FIGS. 1 to 5. As shown in FIGS. 1 and 2, in the HST, a housing 12 incorporates a variable displacement hydraulic pump 10 and a variable displacement hydraulic motor 11. Further, housing 12 incorporates a hydraulic servomechanism 2, which adjusts a tilt angle of a movable swash plate 10a of hydraulic pump 10 so as to control the output rotation of hydraulic pump 10, a hydraulic servomechanism 102, which adjusts a tilt angle of a movable swash plate 11a of hydraulic motor 11 so as to control the output rotation of hydraulic motor 11, a neutral-position holding system 3, a maximum swash plate angle holding system 103, load controlling systems 4 and 104, and others.

Unless a special mention is given, only representative devices for hydraulic pump 10, such as hydraulic servomechanism 2 and neutral-position holding system 3, will be described. In this regard, in the present embodiment, hydraulic motor 11 is provided with devices (hydraulic servomechanism 102 and maximum-swash-plate-angle-position holding system 103), which are substantially equal to the devices (hydraulic servomechanism 2 and neutral-position holding system 3) for hydraulic pump 10. In this embodiment, hydraulic pump 10 and motor 11 are variable in displacement. Alternatively, one of hydraulic pump 10 and motor 11 may be variable in displacement, and the other may be fixed in displacement.

As shown in FIG. 2, hydraulic pump 10 and motor 11 are disposed in housing 12, and are mounted onto a common surface of a duct plate 5 so as to be vertically juxtaposed substantially in parallel. A pair of main fluid passages 13a and 13b (generally or representatively named as "main fluid passage/passages 13") are formed in duct plate 5 (see FIG. 3) so as to constitute a closed circuit fluidly connecting hydraulic pump 10 and motor 11 to each other.

Variable displacement hydraulic pump 10, including a drive shaft 10b, a cylinder block 10c and a plurality of plungers 10d, is provided with a movable swash plate 10a. Drive shaft 10b serves as an input shaft of HST 1. Drive shaft 10b is inserted into duct plate 5, and is supported by housing 12, so as to receive power from an engine 15 (see FIG. 11). Cylinder block 10c is relatively unrotatably fitted on drive shaft 10b so as to be rotatably integral with drive shaft 10b. Plungers 10d are air-tightly and slidably fitted into respective cylinder bores in cylinder block 10c through respective biasing springs. Movable swash plate 10a is rotatably supported by housing 12 so as to serve as a swash plate cam for reciprocally moving plungers 10d, thereby defining slide strokes of plungers 10d. A valve plate 10e is interposed between cylinder block 10c and duct plate 5 and has drive shaft 10b passed therethrough.

In hydraulic pump 10 having the above structure, the plurality of plungers 10d abutting against movable swash plate 10a rotate so as to deliver pressure fluid to hydraulic motor 11 through main fluid passages 13 formed in duct plate 5. Movable swash plate 10a has a surface whose angle relative to the axis of drive shaft 10b is changeable. When the surface of movable swash plate 10a is perpendicular to the axis of drive shaft 10b, hydraulic pump 10 is set in a neutral state for delivering no pressure fluid to hydraulic motor 11 regardless of rotation of drive shaft 10b. By tilting the surface of movable swash plate 10a from the position where the surface is perpendicular to the axis of drive shaft 10b, hydraulic pump 10 delivers pressure fluid to hydraulic motor 11 according to rotation of drive shaft 10b. By adjusting the tilt angle of movable swash plate 10a, the delivery amount of fluid per rotation of drive shaft 10b is adjusted so as to adjust the delivery amount of fluid from hydraulic pump 10, thereby adjusting the rotary speed and direction of a driven shaft 11b of hydraulic motor 11.

Similar to hydraulic pump 10, variable displacement hydraulic motor 11, including driven shaft 11b, a cylinder block 11c and a plurality plungers 11d, is provided with a movable swash plate 11a. Driven shaft 11b serves as an output shaft of HST 1, so as to output the power of engine 15. Description of movable swash plate 11a, cylinder block 11c, plungers 11d and a valve plate 11e is omitted because they are similar to those of hydraulic pump 10.

In hydraulic motor 11, the tilt angle of movable swash plate 11a is adjusted so as to adjust the amount of pressure fluid sucked to hydraulic motor 11. However, the maximum tilt angle of movable swash plate 11a (for establishing the maximum displacement of hydraulic motor 11) is kept unless movable swash plate 10a of hydraulic pump 10 reaches its maximum tilt angle, and unless a speed control operation for accelerating the vehicle is performed with movable swash plate 10a reaching the maximum tilt angle.

Due to this structure, drive shaft 10b of hydraulic pump 10 receives the power of engine 15 so as to drive hydraulic pump 10. Operating fluid delivered by driving hydraulic pump 10 is supplied to hydraulic motor 11 through main fluid passage 13 in duct plate 5, thereby driving hydraulic motor 11, and transmitting the rotary force of hydraulic motor 11 to driven shaft 11b.

With respect to the speed control (acceleration) of HST 1, during the speed control operation after the displacement of hydraulic pump 10 reaches the maximum, i.e., after the tilt angle of movable swash plate 10a reaches the maximum, movable swash plate 11a of hydraulic motor 11 is tilted in a direction for reducing the displacement of hydraulic motor 11 (toward a neutral position thereof).

Hydraulic servomechanism 2 will now be described. As shown in FIGS. 1, 2, 5 and 7, in HST 1, hydraulic pump 10 and hydraulic motor 11 are vertically (maybe laterally) juxtaposed, hydraulic servomechanism 2 for hydraulic pump 10 is disposed on one side of hydraulic pump 10, and hydraulic servomechanism 102 for hydraulic motor 11 is disposed on one side of hydraulic motor 11 and under hydraulic servomechanism 2 for hydraulic pump 10.

Hydraulic servomechanism 2 includes a piston 21 and a swash plate angle control valve 23 having a spool 22 disposed in piston 21. These components are integrally disposed in housing 12 of the HST. Swash plate angle control valve 23 is configured so that a cylinder chamber 24 is formed in a portion of housing 12 sidewise from movable swash plate 10a of hydraulic pump 10, and piston 21 is slidably fitted in cylinder chamber 24. A pin shaft 25 projects from a side portion of movable swash plate 10a and is fitted to a side surface of piston 21. Piston 21 has an axial penetrating hole in which spool 22 is slidably fitted.

Piston 21 is formed therein with a fluid passage connected to a fluid chamber part of cylinder chamber 24 above piston 21, and with a fluid passage connected to a fluid chamber part of cylinder chamber 24 below piston 21. Spool 22 slides so as to connect or disconnect the fluid passages formed in piston 21 to and from each other. When the fluid passages are connected to each other, fluid is passed between the fluid chambers above and below piston 21 (in cylinder chamber 24) so as to vertically slide piston 21.

Spool 22 is formed at a lower peripheral surface thereof with an engagement groove 26, into which a first end portion 27a of pin 27, serving as a speed-controlling motive member (of spool 22) of hydraulic servomechanism 2, is engaged. A second end portion 27b of pin 27 is nipped by a twisted spring 28 constituting later-discussed neutral-position holding system 3. Housing 12 is formed at a side surface thereof with an opening 12a, piston 21 is formed at a side surface thereof with an opening 21a, and first end portion 27a of pin 27 is inserted into housing 12 through openings 12a and 21a, and is engaged into engagement groove 26 as mentioned above.

Figure 5:
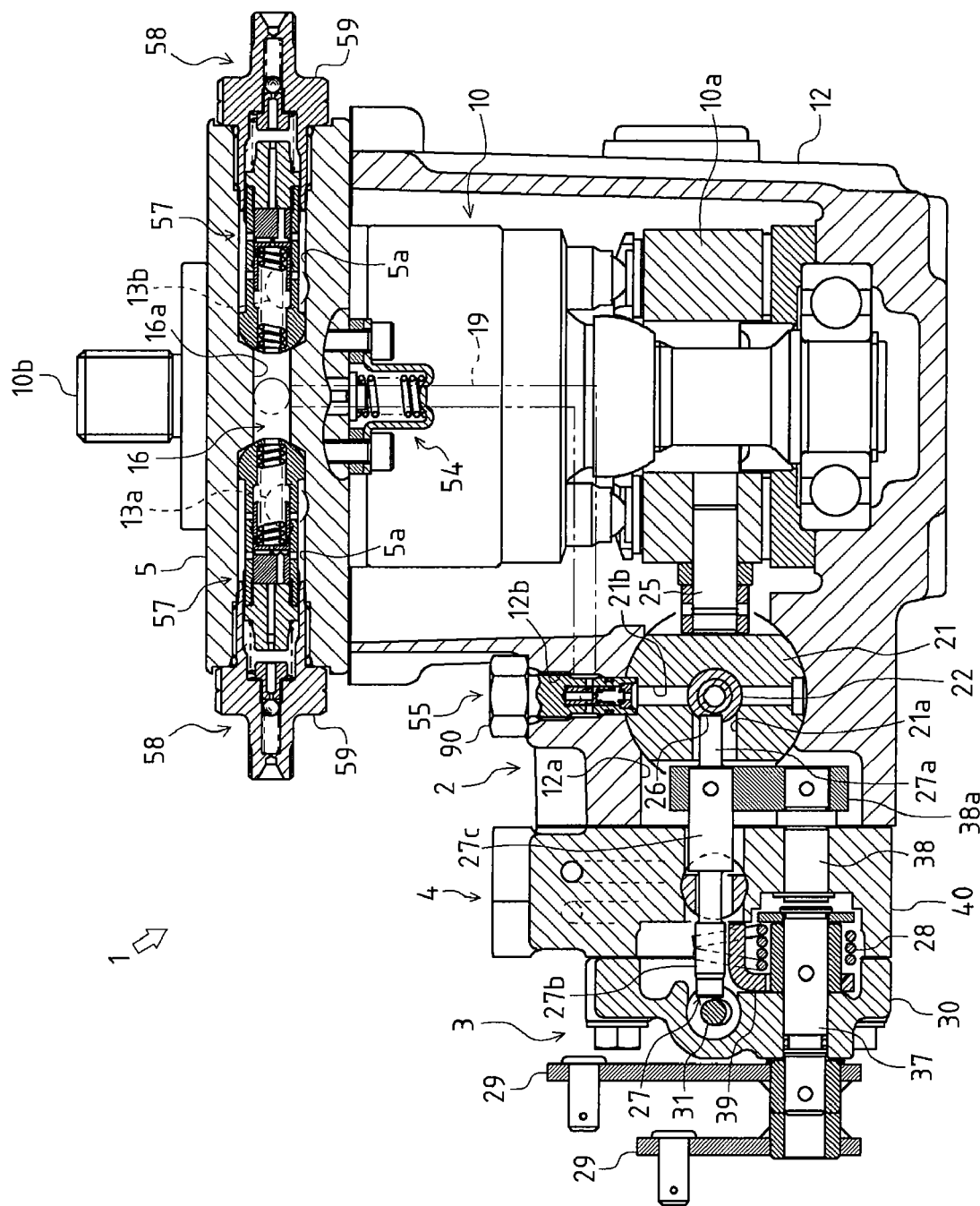
FIG. 5 is a sectional plan view of the HST.
Figure 6:
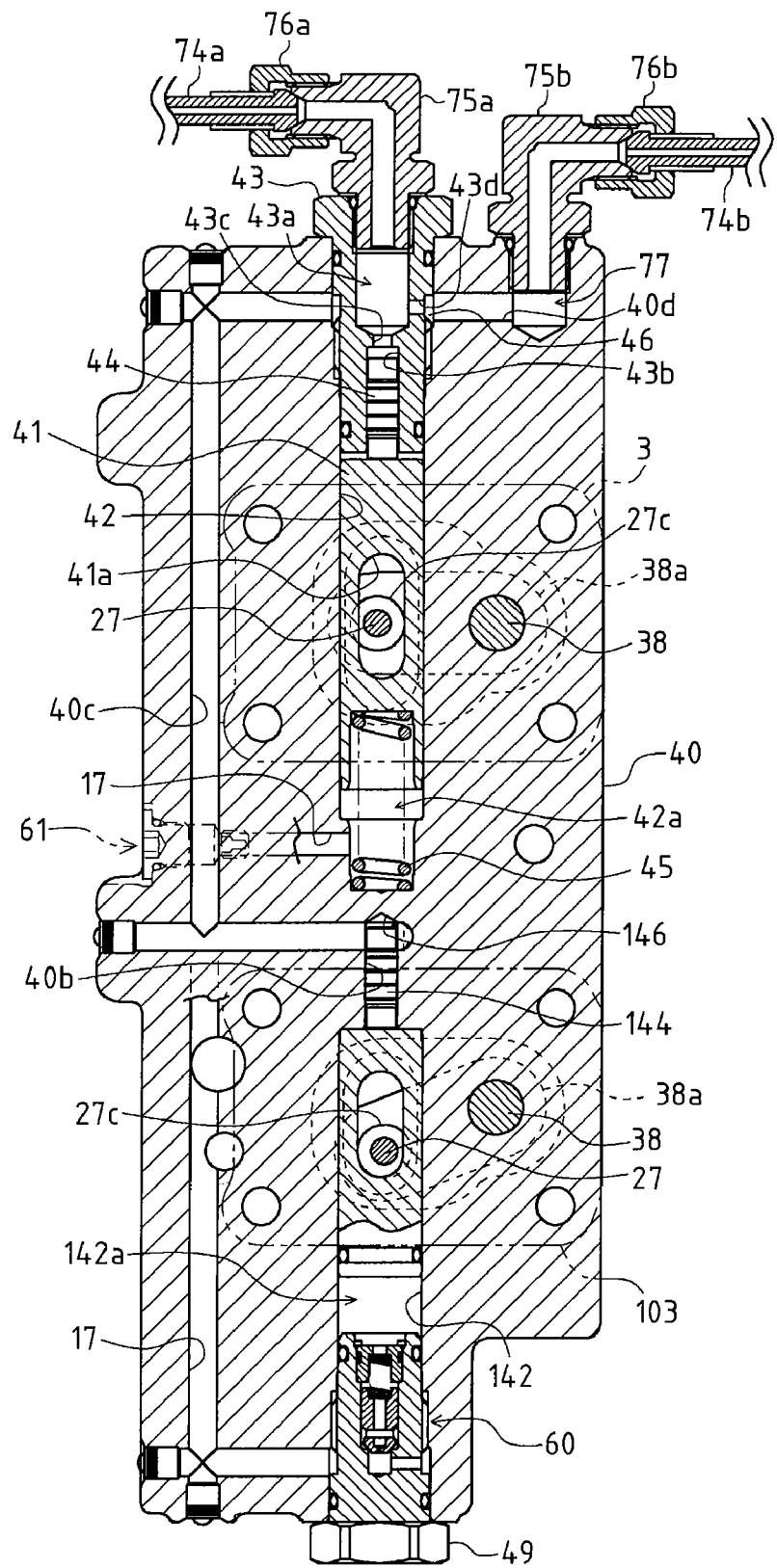
FIG. 6 is a sectional side view of load controlling systems.

As shown in FIGS. 5, 6 and others, a cylinder 40 is attached onto a side of housing 12 so as to constitute later-discussed load controlling systems 4 and 104, a pivot shaft 38 is supported by cylinder 40, and pin 27 is rotatably supported onto pivot shaft 38 through a support arm 38a. In other words, pivot shaft 38 is supported substantially in parallel to pin 27, and pin 27 is supported at first end portion 27a by support arm 38a fixed on pivot shaft 38 so as to be rotatably centered on pivot shaft 38.

A speed control operation lever 29 of hydraulic servomechanism 2 interlocks with pin 27 so that, by operating speed control operation lever 29, pin 27 is moved vertically (in FIGS. 1 and 7) against the force of twisted spring 28 so as to vertically move spool 22.

In this way, piston 21 is slid by change of fluid passage in swash plate angle control valve 23 by sliding spool 22, thereby tilting movable swash plate 10a of hydraulic pump 10 for speed-controlling HST 1.

Figure 7:
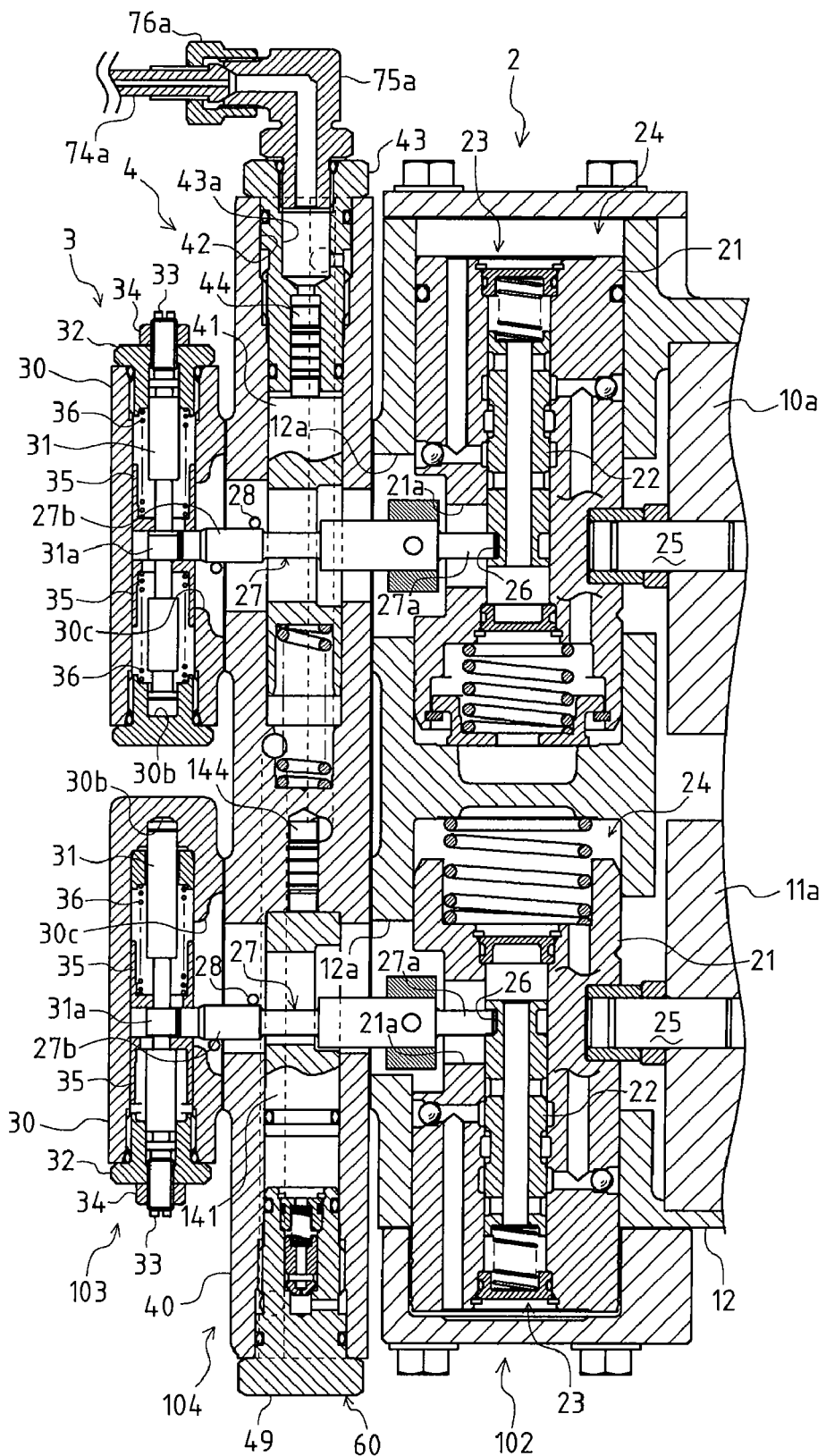
FIG. 7 is a fragmentary expanded view of FIG. 1.

Neutral-position holding system 3 and others will be described. As shown in FIGS. 1, 5, 7 and others, neutral-position holding system 3 is disposed opposite to hydraulic servomechanism 2 with respect to load controlling system 4, so as to hold movable swash plate 10a of hydraulic pump 10 at its neutral position. Neutral-position holding system 3 is disposed in a casing 30. A detent rod 31 is axially (in FIGS. 1 and 7, vertically) slidably disposed in an inner space of casing 30.

Detent rod 31 is supported at a first end thereof in recess 30b, which is formed by casing 30 or is formed in a cap screwed into casing 30. Detent rod 31 is supported at a second end thereof by a cap 32 screwed into casing 30. An adjusting bolt 33 is formed integrally on the second end portion of detent rod 31 so as to be screwed into cap 32. Detent rod 31 is longitudinally (i.e., axially) slidable by rotating adjusting bolt 33, and normally fixed in place by a lock nut 34.

A fixture portion 31a is formed on a substantially middle portion of detent rod 31. Second end portion 27b of pin 27 is pointed to fixture portion 31a and is inserted into the inner space of casing 30. In this regard, second end portion 27b of pin 27 has a diameter, which is substantially as large as the width of fixture portion 31a (i.e., the axial length of detent rod 31 at fixture portion 31a).

In the inner space of casing 30, a pair of spring retainers 35 are axially slidably disposed on opposite sides of fixture portion 31a of detent rod 31. A pair of springs 36 are interposed between casing 30 or the cap and spring retainer 35, and between cap 32 and spring 35. Spring retainers 35 are biased toward fixture portion 31a by respective springs 36. Namely, fixture portion 31a of detent rod 31 and second end portion 27b of pin 27 are pressed in the opposite directions so as to be nipped between spring retainers 35.

As shown in FIG. 5, speed control operation lever 29 is supported by casing 30 so as to be rotatably centered on a pivot shaft 37. Twisted spring 28 is rotatably wound around pivot shaft 37 so as to nip second end portion 27b of pin 27. A connection arm 39 is fixed on pivot shaft 37 so as to be rotatably integral with pivot shaft 37, and is nipped by twisted spring 28.

When speed control operation lever 29 is rotated, connection arm 39 fixed on pivot shaft 37 and twisted spring 28 nipping connection arm 39 are rotated integrally with speed control operation lever 29. In other words, when speed control operation lever 29 is rotated, pin 27 rotates integrally with speed control operation lever 29 through connection arm 39 and twisted spring 28, so as to slide spool 22 of hydraulic servomechanism 2. In this way, speed control operation lever 29, pivot shaft 37, connection arm 39 and twisted spring 28 and others constitute a speed control operation lever unit.

Unless speed control operation lever 29 is rotated, second end portion 27b of pin 27 is nipped together with fixture portion 31a of detent rod 31 between spring retainers 35, thereby holding the rotational position of pin 27 corresponding to fixture portion 31a. In HST 1 according to the present embodiment, movable swash plate 10a of hydraulic pump 10 is disposed at its neutral position when speed control operation lever 29 is free from an operation force and second end portion 27b of pin 27 is held by spring retainers 35.

In this way, neutral-position holding system 3 has detent rod 31, springs 36 and spring retainers 35, so as to hold the neutral position of movable swash plate 10a of hydraulic pump 10 through pin 27 and hydraulic servomechanism 2.

In other words, neutral-position holding system 3 supports pin 27, which interlocks with movable swash plate 10a of hydraulic pump 10 through hydraulic servomechanism 2, by the biasing of twisted spring 28 and the like, so as to hold movable swash plate 10a at the neutral position. Pivot shaft 37 of speed control operation lever 29 is engaged to the intermediate portion of pin 27 for sliding spool 22 through connection arm 39 and twisted spring 28, so as to operatively integrate pin 27 with speed control operation lever 29. First end portion 27a of pin 27 is extended in one direction from the portion of pin 27 engaged to pivot shaft 37 so as to drive spool 22, and second end portion 27b of pin 27 is extended in the other direction from the portion of pin 27 engaged to pivot shaft 37 so as to be engaged to detent rod 31, thereby defining the neutral position.

Neutral-position holding system 3 configured as mentioned above is provided with an adjusting mechanism (a neutral-position adjusting mechanism) for minutely adjusting the neutral position. In this regard, detent rod 31 is axially movable by rotating adjusting bolt 33 screwed into cap 32. If movable swash plate 10a of hydraulic pump 10 deviates from its neutral position while pin 27 is held at the position corresponding to fixture portion 31a, adjusting bolt 33 is rotated so as to adjust the position of fixture portion 31a of detent rod 31, thereby correctly locating movable swash plate 10a at the neutral position while pin 27 is held at the position corresponding to fixture portion 31a.

On the other hand, maximum swash plate angle holding system 103 is provided to hydraulic motor 11. Maximum swash plate angle holding system 103 is configured substantially similar to neutral-position holding system 3, however, maximum swash plate angle holding mechanism 103 is adapted to hold movable swash plate 11a of hydraulic motor 11 at the maximum tilt angle.

Maximum swash plate angle holding system 103 includes a zero-degree angle adjusting mechanism, similar to the neutral-position adjusting mechanism of neutral-position holding system 3. The zero-degree angle adjusting mechanism has adjusting bolt 33 so that, when movable swash plate 11a of hydraulic motor 11 deviates from its zero-degree angle, adjusting bolt 33 is rotated so as to correctly locate movable swash plate 11a at its zero-degree angle.

Figure 8:
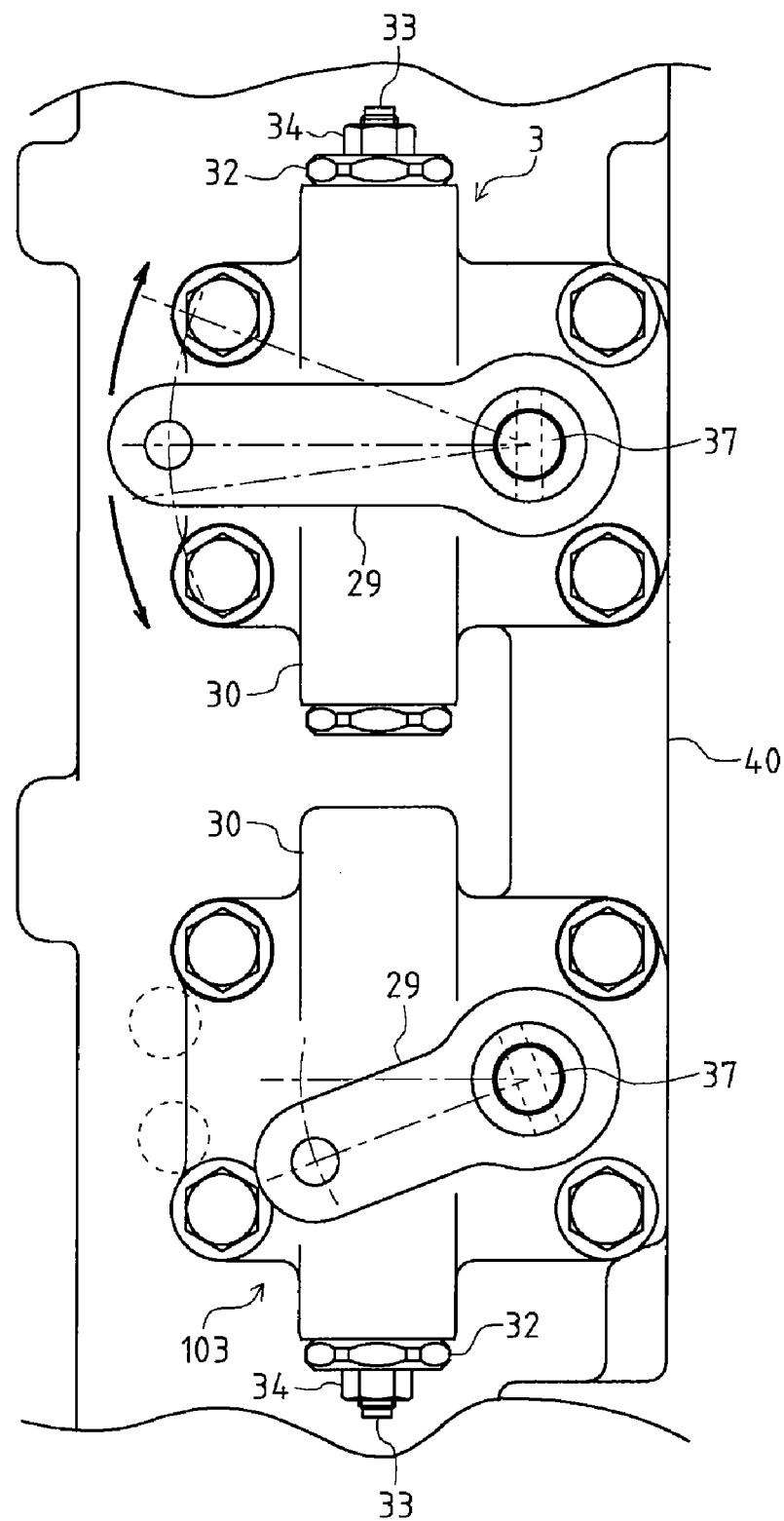
FIG. 8 is a view of speed control levers of the hydraulic servomechanisms.

Due to this configuration, as shown in FIG. 8, speed control operation lever 29 for hydraulic pump 10 is disposed substantially horizontally when movable swash plate 10a of hydraulic pump 10 is disposed at the neutral position. When speed control operation lever 29 is rotated upward or downward centered on pivot shaft 37, movable swash plate 10a of hydraulic pump 10 is tilted through hydraulic servomechanism 2. Another speed control operation lever 29 for hydraulic motor 11 is disposed downwardly slantwise when movable swash plate 11a of hydraulic motor 11 is disposed at the maximum tilt angle. When this speed control operation lever 29 is rotated upward centered on its pivot shaft 37, movable swash plate 11a of hydraulic motor 11 is tilted toward its neutral position. The pair of speed control operation levers 29 are operatively connected to a speed control operation device, such as a pedal or a lever, (which can select whether the traveling direction of the vehicle is forward or backward) in a driver's section of the vehicle. A speed control operation of the speed control operation device from a zero speed position to a certain speed position causes rotation of speed control operation lever 29 of hydraulic pump 10, and a speed control operation of the speed control operation device to increase the speed from that corresponding to the certain speed position causes rotation of speed control operation lever 29 of hydraulic motor 11.

Load controlling systems 4 and 104 will be described with reference to FIGS. 6, 7, 9 and 10. First, description will be given of load controlling system 4 for hydraulic pump 10. Load controlling system 4 includes cylinder 40 and a spool 41. Pressure fluid from main fluid passage 13 is supplied and drained to and from cylinder 40. Spool 41 is slidably fitted in cylinder 40 and is engaged to pin 27 serving as the speed-controlling motive member. In cylinder 40, main fluid passage 13 is connected to a first side of spool 41, so that, when load is controlled, spool 41 is pushed by hydraulic pressure from main fluid passage 13 so as to move pin 27 engaging with spool 41. Therefore, load controlling system 4 controls the tilt angle of movable swash plate 10a of hydraulic pump 10 independently of the tilt operation of movable swash plate 10a by operating speed control operation lever 29 according to the speed control operation device provided in the driver's section of the vehicle (by hydraulic servomechanism 2 or so on).

Cylinder 40 is vertically extended along a substantially flat side wall surface of housing 12, and attached to the side wall surface of housing 12 so as to be interposed between hydraulic servomechanism 2 and neutral-position holding system 3. An upwardly opened vertical cylinder hole 42 is bored in cylinder 40, and substantially columnar spool 41 is slidably fitted in cylinder hole 42.

A pipe joint 43 is screwed into the opened (top) end of cylinder hole 42 so as to be connected to a fluid passage for the pressure fluid supplied from main fluid passage 13, so that the pressure fluid from main fluid passage 13 is supplied into cylinder 40 through pipe joint 43. An opening 40a laterally penetrates a vertical intermediate portion of cylinder 40 so as to have pin 27 passed therethrough.

Pipe joint 43 is screwed into cylinder hole 42 so as to fluidly tightly fit an inner peripheral surface of pipe joint 43. A fluid suction-and-delivery port 43a is provided in joint pipe 43. Pressure fluid is led from main fluid passage 13 into fluid suction-and-delivery port 43a so that its hydraulic pressure is detected. Pipe joint 43 is bored therein with a pin hole 43b opened toward spool 41. A pin 44 is slidably inserted into pin hole 43b and abuts at one end thereof against an upper surface of spool 41.

Pin hole 43b is connected to fluid supply-and-delivery port 43a in pipe joint 43 through an orifice 43c. In this regard, pressure fluid in fluid supply-and-delivery port 43a is supplied into pin hole 43b through orifice 43c so as to slide pin 44 according to hydraulic pressure in main fluid passage 13. For example, when the hydraulic pressure in main fluid passage 13 is increased, pin 44 is pushed outward from pin hole 43b so that spool 41 is pressed and slid downward by pin 44.

Spool 41 is bored at a substantially longitudinally middle portion thereof by a vertical long penetrating hole 41a, through which pin 27 is passed. Penetrating hole 41a is opened to opening 40a of cylinder 40 while spool 41 is fitted in cylinder hole 42. Since cylinder 40 is interposed between housing 12 and casing 30, opening 40a is opened at one side thereof to openings 12a and 21a formed in respective side surfaces of housing 12 and piston 21, and is opened at the other side thereof to an opening 30c formed in a side surface of casing 30. Opening 40a of cylinder 40, penetrating hole 41a of spool 41 and others constitute a free-passage space, in which pin 27 is disposed so as to penetrate load controlling system 4 (including cylinder 40 and spool 41) in the shorter direction of load controlling system 4.

Spool 41 is formed at an edge thereof around the opening of penetrating hole 41a with a notched portion 41b, which is notched so as to expand penetrating hole 41a. Bar-shaped pin 27 is formed thereon with a large diameter portion 27c corresponding to notched portion 41b. Accordingly, due to the slide of spool 41 in the longitudinal direction of cylinder 40 (vertically), notched portion 41b of spool 41 is adapted to abut against large diameter portion 27c of pin 27. More specifically, the diameter increase of pin 27 at large diameter portion 27c is larger than the expansion of penetrating hole 41a by notched portion 41b, so that pin 27 abuts at large diameter portion 27c against notched portion 41b while pin 27 is prevented from abutting against the side surface of penetrating hole 41a. Further, in spool 41, penetrating hole 41a and notched portion 41b are formed so as to have a space which is larger than the movable range of pin 27. Therefore, the vertical movement of pin 27 keeping its horizontal axis does not cause pin 27 to abut against spool 41, however, the slide of spool 41 causes notched portion 41b of spool 41 to abut against large diameter portion 27c of pin 27. Namely, pin 27 is slidably integral with spool 41 due to the slide of spool 41.

Cylinder hole 42 is formed therein with a counter pressure chamber 42a on a second side of spool 41 (opposite to the first side of spool 41 connected to main fluid passage 13). A spring 45 is disposed in counter pressure chamber 42a. Spring 45 is interposed between a bottom surface of cylinder hole 42 and a lower end surface of spool 41 so as to press spool 41. Further, pressure fluid charged to HST 1 is partly led to counter pressure chamber 42a so as to press spool 41 against the hydraulic pressure of fluid from main fluid passage 13, as discussed later. Consequently, in cylinder hole 42, spool 41 is pressed downward by pin 44, and is pressed upward by spring 45 and the charged pressure fluid against the downward pressure.

Load controlling system 104 for hydraulic motor 11 will now be described. Load controlling system 104 is also configured in cylinder 40 having cylinder hole 42 constituting load controlling system 4 for hydraulic pump 10. In this regard, cylinder 40 is attached onto the side of housing 12 as mentioned above, so that cylinder 40 is disposed between hydraulic servomechanism 102 for hydraulic motor 11 and maximum swash plate angle holding system 103. Cylinder 40 is provided therein with a spool 141 and others constituting load controlling system 104 for hydraulic motor 11 while cylinder 40 is provided therein with spool 41 and others constituting load controlling system 4 for hydraulic pump 10. Spool 141 is pushed by pressure fluid supplied into cylinder 40 from main fluid passage 13 of the HST. Therefore, load controlling system 104 controls the tilt angle of movable swash plate 11a of hydraulic motor 11 independently of the tilt operation of movable swash plate 11a by operating hydraulic servomechanism 102 and so on according to the speed control operation device provided on the driver's section in the vehicle.

Cylinder 40 is bored therein with a downwardly opened vertical cylinder hole 142, in which substantially columnar spool 141 is slidably fitted. An opening 140a laterally penetrates a vertical intermediate portion of cylinder 40 corresponding to load controlling system 104 so as to have pin 27 passed therethrough. A bolt member 49 serving as a later-discussed slow-return valve 60 is screwed into the opened (bottom) end of cylinder hole 142.

Cylinder 40 is bored therein with a pin hole 40b opened to a portion of cylinder hole 142 above spool 141 fitted in cylinder hole 142. A pin 144 is slidably fitted in pin hole 40b and abuts at one end thereof against a top surface of spool 141.

A fluid passage 40c is formed in cylinder 40, and pin hole 40b is opened through fluid passage 40c to fluid suction-and-delivery port 43a, which is formed in pipe joint 43 provided to load controlling system 4 as mentioned above, so as to lead pressure fluid from main fluid passage 13 into pin hole 40b.

Figure 9:
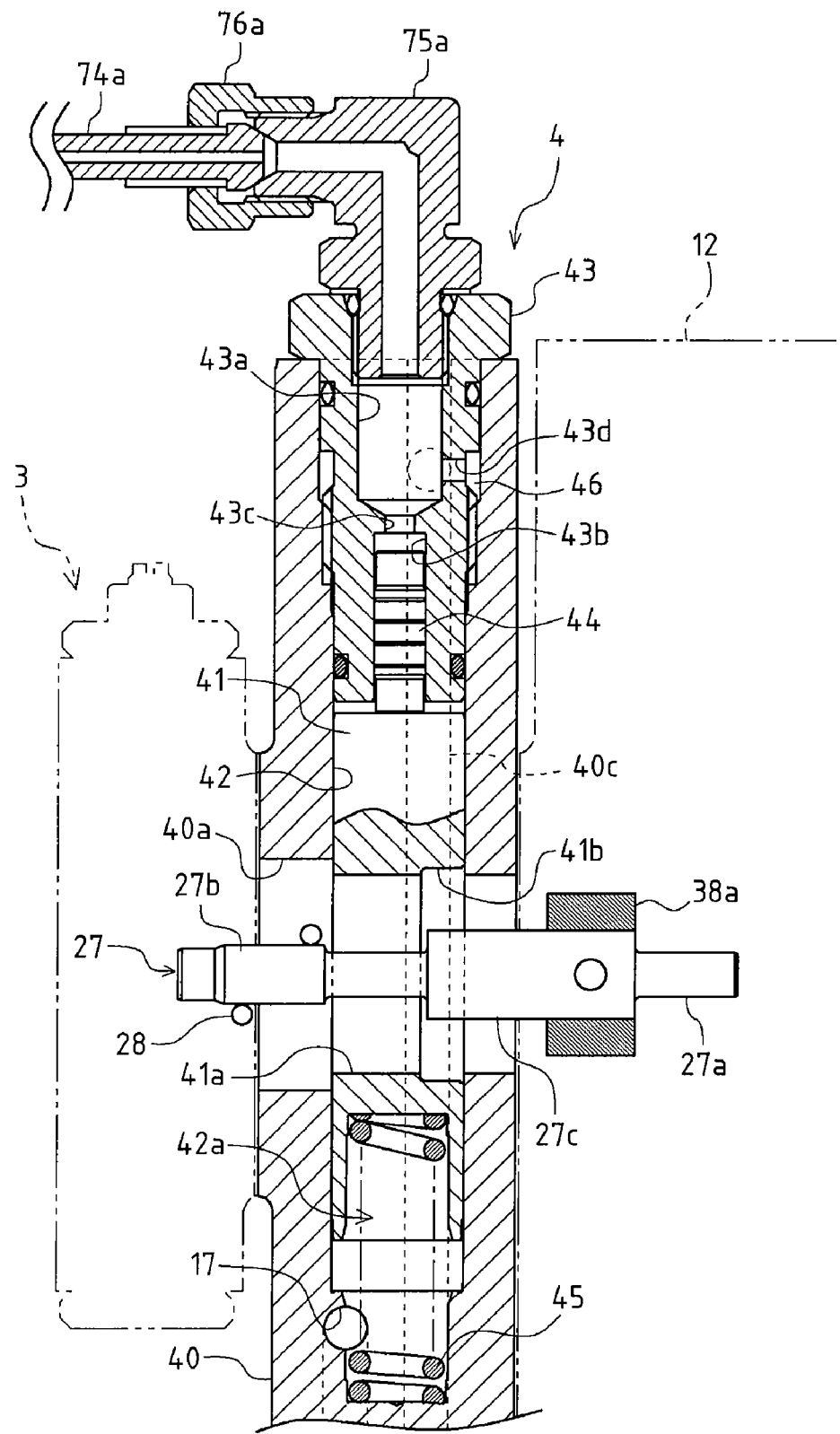
FIG. 9 is a sectional view of a load controlling system for a hydraulic pump.
Figure 10:
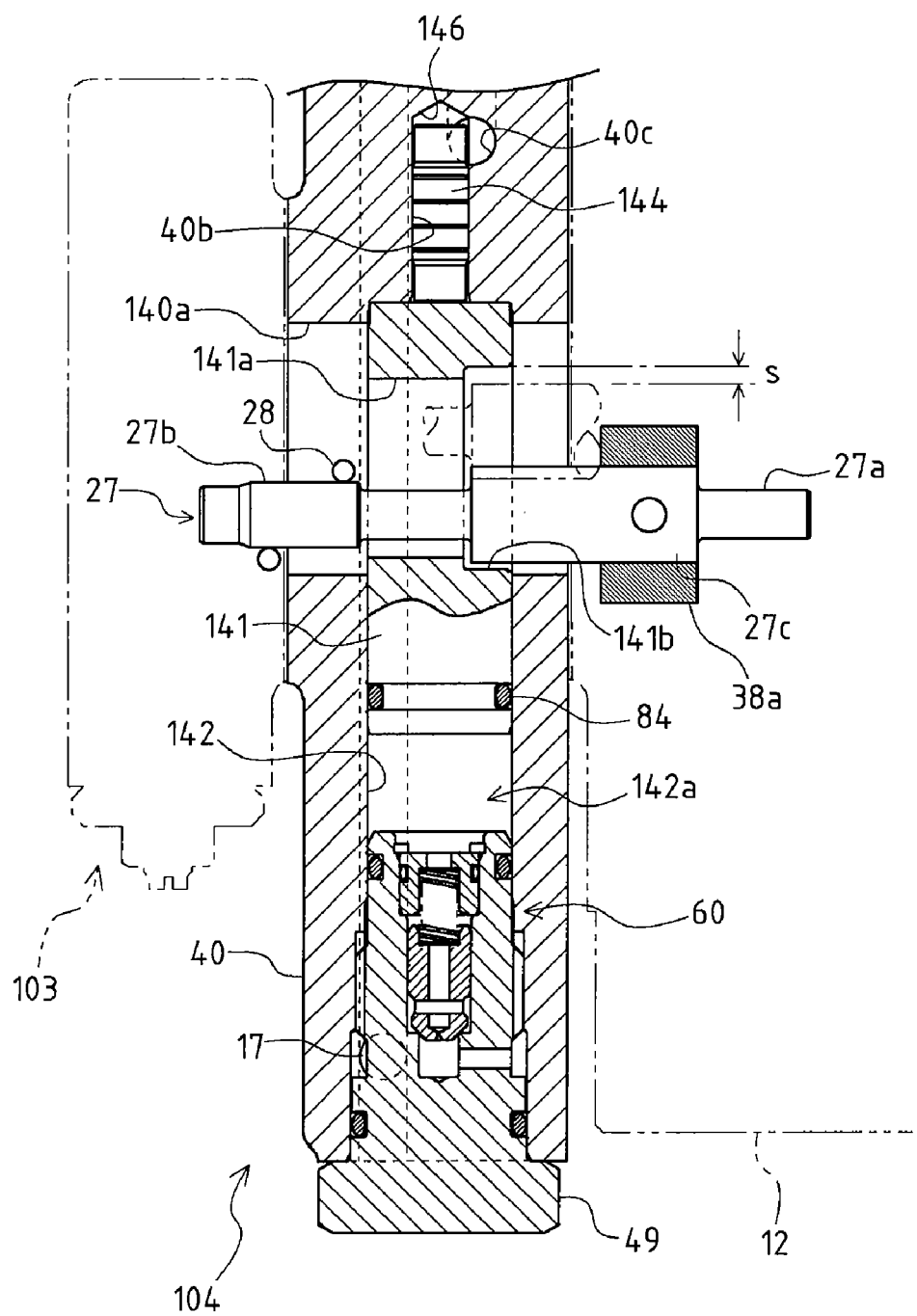
FIG. 10 is a sectional view of a load controlling system for a hydraulic motor.

In this regard, as shown in FIGS. 6, 9, 10 and others, load controlling system 4 has a fluid gallery 46, which is an annular groove formed on pipe joint 43 between pipe joint 43 and cylinder hole 42, and is opened to fluid suction-and-delivery port 43a through a fluid hole 43d. On the other hand, load controlling system 104 has a fluid gallery 146, which is a portion of pin hole 40b on a side of pin 144 opposite to the side of pin 144 contacting spool 141. Fluid galleries 46 and 146 are connected to each other through fluid hole 40c.

Therefore, pressure fluid in fluid suction-and-delivery port 43a is led into pin hole 40b through fluid passage 40c so as to slide pin 144 correspondingly to the hydraulic pressure in main fluid passage 13. For example, when the hydraulic pressure in main fluid passage 13 is increased, pin 144 is pushed outward from pin hole 40b so that spool 141 is pressed and slid downward by pin 144.

Spool 141 is bored at a substantially longitudinally middle portion thereof by a vertical long penetrating hole 141a through which pin 27 is passed. Penetrating hole 141a is opened to opening 140a of cylinder 40 while spool 141 is fitted in cylinder hole 142. Since cylinder 40 is interposed between housing 12 and casing 30, opening 140a is opened at one side thereof to openings 12a and 21a formed in the respective side surfaces of housing 12 and piston 21, and is opened at the other side thereof to opening 30c formed in the side surface of casing 30. Opening 140a of cylinder 40, penetrating hole 141a of spool 141 and others constitute a free-passage space, in which pin 27 is disposed so as to penetrate load controlling system 104 (including cylinder 40 and spool 141) in the shorter direction of load controlling system 104.

Spool 141 is formed with a notched portion 141b at an edge around the opening of penetrating hole 141a so as to expand penetrating hole 141a. Similar to that of load controlling system 4, notched portion 141b is adapted to abut against large diameter portion 27c of bar-shaped pin 27, so that pin 27 is slidably integral with spool 141 due to the slide of spool 141.

Cylinder hole 142 has a counter pressure chamber 142a below spool 141 therein, i.e., between spool 141 and bolt member 49. Pressure fluid charged to HST 1 is partly led to counter pressure chamber 142a so as to press spool 141 against the hydraulic pressure of fluid from main fluid passage 13, as discussed later. Consequently, in cylinder hole 142, spool 141 is pressed downward by pin 144, and is pressed upward by the charged pressure fluid against the downward pressure.

Unless load controlling system 104 for hydraulic motor 11 is actuated, i.e., while pin 144 is withdrawn into pin hole 40b (as shown in FIG. 10 and others) and movable swash plate 11a is disposed at the maximum tilt angle, large diameter portion 27c of pin 27 substantially abuts against the bottom side of notched portion 141b.

Load controlling system 104 having the above structure controls movable swash plate 11a of hydraulic motor 11 so as to reduce the tilt angle of movable swash plate 11a (to increase the displacement of hydraulic motor 11), thereby controlling torque.

In HST 1 having the above configuration, apart from the control of tilt angles of movable swash plates 10a and 11a by speed control operation levers 29, when engine 15 receives a load torque, load controlling system 4 or 104 controls a tilt angle of movable swash plate 10a or 11a of hydraulic pump 10 or motor 11 so as to prevent engine 15 from stalling.

In the present embodiment, HST 1 is speed-controlled (accelerated) so that movable swash plate 11a of hydraulic motor 11 is tilted from its maximum tilt angle in the direction for reducing the displacement of hydraulic motor 11 after the displacement of hydraulic pump 10 reaches the maximum. However, with respect to the load control by load controlling systems 4 and 104, if movable swash plate 11a has been tilted from its initial position, firstly, hydraulic motor 11 is controlled for deceleration (for increasing its displacement), and subsequently, hydraulic pump 10 is controlled for deceleration (for reducing its displacement). Therefore, as mentioned above, load controlling system 4 for hydraulic pump 10 has spring 45 disposed in counter pressure chamber 42a so as to regulate the pressure onto spool 41 against the hydraulic pressure from main fluid passage 13.

In other words, due to load controlling systems 4 and 104, the tilt angle of movable swash plate 10a of hydraulic pump 10 is mainly controlled in a low speed range (e.g., one third of the whole speed range), and the tilt angle of movable swash plate 11a of hydraulic motor 11 is mainly controlled in a middle-and-high speed range (e.g., the remaining two thirds of the whole speed range). In the low speed range, movable swash plate 10a of hydraulic pump 10 is allowed to rotate while movable swash plate 11a of hydraulic motor 11 is fixed at the maximum tilt angle. At the transition of increased set speed from the speed range into the middle-and-high speed range, the tilt angle of movable swash plate 10a of hydraulic pump 10 reaches the maximum, and immediately, movable swash plate 10a of hydraulic pump 10 is fixed, and movable swash plate 11a of hydraulic motor 11 is allowed to rotate to reduce its tilt angle.

The load control by load controlling system 4 for hydraulic pump 10 mainly performed in the low speed range will be described. In load controlling system 4 of hydraulic pump 10, when engine 15 is overloaded, the hydraulic pressure in main fluid passage 13 is increased, so that the hydraulic pressure in cylinder 40 (in fluid suction-and-delivery port 43a) is increased so as to push spool 41 through pin 44, thereby moving pin 27 engaged with spool 41 against the force of twisted spring 28. Consequently, the tilt angle of movable swash plate 10a of hydraulic pump 10 is reduced for deceleration of the vehicle apart from the tilt angle control by hydraulic servomechanism 2 or so on. In a normal condition, pin 44 is withdrawn into pin hole 43b by spool 41 due to the force of spring 45 and the charged hydraulic pressure.

When speed control operation lever 29 is rotated by speed control operation through a linkage (not shown) during traveling of working vehicle with HST 1, pin 27 moves together with speed control operation lever 29, so that, in hydraulic servomechanism 2, spool 22 slides according to the motion of pin 27 so as to change an opened fluid passage, thereby sliding piston 21, and rotating movable swash plate 10a of hydraulic pump 10 engaged with piston 21.

With respect to HST 1 of the present embodiment, when speed control operation lever 29 is rotated for starting the stationary working vehicle for forward traveling, pin 27 is moved upward. When speed control operation lever 29 is rotated for starting the stationary working vehicle for backward traveling, pin 27 is moved downward. According to the motion of pin 27, movable swash plate 10a is gradually rotated to increase its tilt angle. This rotation of movable swash plate 10a is controlled by hydraulic servomechanism 2 and neutral-position holding system 3.

In this situation, during low-speed traveling of the vehicle at work, as load on engine 15 is increased, the hydraulic pressure in main fluid passage 13 is increased so as to increase the hydraulic pressure in fluid suction-and-delivery port 43a. At this time, if the pressure of pin 44 onto spool 41 by receiving the hydraulic pressure from fluid suction-and-delivery port 43a exceeds the pressure onto spool 41 by the biasing force of spring 45 and the charged hydraulic pressure led into counter pressure chamber 42a, spool 41 slides downward. Accordingly, notched portion 41b of spool 41 comes to abut against large diameter portion 27c of pin 27, so as to engage spool 41 with pin 27, thereby downwardly moving pin 27 against the biasing force of spring 45 and the charged hydraulic pressure in counter pressure chamber 42a applied onto spool 41. Namely, pin 27 is moved for deceleration by spool 41, so as to rotate movable swash plate 10a of hydraulic pump 10 for deceleration, thereby decelerating HST 1 and increasing the tractive effort of the vehicle.

In this state, even if speed control operation lever 29 is rotated for acceleration by the accelerating-operation of the speed control operation device in the driver's section of the vehicle, the rotation of connection arm 39 causes only rotation of twisted spring 28, and movable swash plate 10a is not further rotated for acceleration, thereby preventing the engine from stalling caused by overload.

Afterward, spool 41 slides upward by the biasing force of spring 45 and the charged hydraulic pressure when the load is reduced, the hydraulic pressure in main fluid passage 13 is reduced, the hydraulic pressure in fluid suction-and-delivery port 43a is reduced, and the pressure of pin 44 onto spool 41 becomes less than the total of the biasing force of spring 45 and the charged hydraulic pressure. Consequently, pin 44 is withdrawn into pin hole 43b, and pin 27 is returned to the position determined by speed control operation lever 29 by the biasing force of twisted spring 28. Thus, movable swash plate 10a of hydraulic pump 10 is returned to the tilt angle determined by speed control operation lever 29 or the like, and is held in place again.

In this regard, when the working vehicle normally travels, the output rotary speed of HST 1 is increased and decreased by rotation of speed control operation lever 29. However, when the low-speed traveling vehicle works with its loader, driven shaft 11b required to have a large tractive effort receives a large load torque such as to apply load on engine 15. If the load on engine 15 exceeds the engine power, engine 15 stalls. Therefore, due to the above structure, when the hydraulic pressure in main fluid passage 13 is increased by the overload on the engine, spool 41 in cylinder 40 slides by receiving the hydraulic pressure from main fluid passage 13, so as to control movable swash plate 10a of hydraulic pump 10 to reduce its tilt angle. Namely, when engine 15 is overloaded, regardless of the operation of speed control operation lever 29, the tilt angle of movable swash plate 10a of hydraulic pump 10 is reduced so as to reduce the delivery amount of fluid from hydraulic pump 10, and to reduce the traveling speed of the vehicle, thereby preventing engine 15 from stalling.

In this way, when engine 15 is overloaded, load controlling system 4 automatically controls the tilt angle of movable swash plate 10a of hydraulic pump 10 regardless of the tilt angle control by speed control operation lever 29.

The load control by load controlling system 104 for hydraulic motor 11 mainly performed in the middle-and-high speed range will be described. In load controlling system 104 for hydraulic motor 11 also automatically controls the tilt angle of movable swash plate 11a of hydraulic motor 11, similar to load controlling system 4 for hydraulic pump 10. However, as mentioned above, hydraulic motor 11 has movable swash plate 11a, which is disposed at the maximum tilt angle while the vehicle is stationary, and is controlled to reduce its tilt angle according to acceleration of the vehicle. On this assumption, load controlling system 104 is configured as follows.

Load controlling system 104 also has pin 27, twisted spring 28 and speed control operation lever 29, so that, when speed control operation lever 29 is operated, pin 27 is moved together with lever 29 and is fixed in place by twisted spring 28. Accordingly, hydraulic servomechanism 102 moves movable swash plate 11a of hydraulic motor 11 from the maximum tilt angle to reduce the tilt angle.

In this situation, during middle or high speed traveling of the vehicle at work, when engine 15 is overloaded, the hydraulic pressure in main fluid passage 13 is increased so as to increase the hydraulic pressure in fluid gallery 146. At this time, if the pressure of pin 144 onto spool 141 by receiving the hydraulic pressure from fluid gallery 146 exceeds the pressure onto spool 141 by the charged hydraulic pressure led into counter pressure chamber 142a, spool 141 slides downward. Accordingly, notched portion 141b of spool 141 comes to abut against large diameter portion 27c of pin 27, so as to engage spool 141 with pin 27, thereby downwardly moving pin 27 against the biasing force of twisted spring 28 and the charged hydraulic pressure in counter pressure chamber 142a applied onto spool 141. Namely, pin 27 is moved for deceleration by spool 141, so as to rotate movable swash plate 11a of hydraulic motor 11 for deceleration, thereby decelerating HST 1 and increasing the tractive effort of the vehicle.

Even while this load control in hydraulic motor 11 is performed in the middle-and-high speed range, spool 41 in load controlling system 4 is prevented from sliding downward, thereby holding movable swash plate 10a of hydraulic pump 10 at its high speed position, because spool 41 is pressed by the force of spring 45 in addition to the charged hydraulic pressure against the hydraulic pressure from main fluid passage 13.

Afterward, similar to the case of load controlling system 4, spool 141 slides upward when the load is reduced and the pressure of pin 144 onto spool 141 becomes less than the charged hydraulic pressure applied onto spool 141. Consequently, pin 27 is returned to the position determined by speed control operation lever 19. Thus, movable swash plate 11a of hydraulic motor 11 is returned to the tilt angle determined by speed control operation lever 29 or the like, and is held in place again.

Namely, similar to load controlling system 4 for hydraulic pump 10, load controlling system 104 for hydraulic motor 11 controls the tilt angle of movable swash plate 11a of hydraulic motor 11 so as to decelerate the vehicle when the hydraulic pressure in main fluid passage 13 rises.

In this way, due to the load control by load controlling systems 4 and 104, HST 1 according to the invention controls the tilt angle of movable swash plate 10a or 11a of hydraulic pump 10 or motor 11 so as to prevent the tractive effort of the HST from exceeding the power of engine 15 in correspondence to the whole speed range of the vehicle.

Alternatively, only one of load controlling systems 4 and 104 may be provided to hydraulic pump 10 or motor 11.

A hydraulic circuit of HST 1 having the above configuration will be described with reference to the hydraulic circuit diagram of FIG. 11. A charge pump (hydraulic pump) 50 for charging operating fluid to main fluid passages 13 (13a and 13b) has a pump shaft 51, which is driven by engine 15 so that charge pump 50 sucks fluid from a fluid tank 52.

A charge fluid passage 16 is connected to a delivery port of charge pump 50 so as to supply operating fluid into HST 1 through a filter 53. In this regard, operating fluid from charge fluid passage 16 is distributed among (cylinder chambers 24 of) hydraulic servomechanisms 2 and 102, main fluid passages 13a and 13b and others.

Main fluid passages 13a and 13b are provided with respective later-discussed neutral-check-relief valves 57 each of which is interposed between charge fluid passage 16 and each of main fluid passages 13a and 13b.

A charge relief valve 54 is provided on charge fluid passage 16 (see FIGS. 2 and 5). When hydraulic pressure in charge fluid passage 16 exceeds a threshold value, charge relief valve 54 is opened to release operating fluid from charge fluid passage 16 to a fluid sump 56 formed in housing 12 so as to regulate the amount of operating fluid.

Drive shaft 10b of variable displacement hydraulic pump 10 receives the driving force from engine 15 so as to rotate cylinder block 10c and others of hydraulic pump 10. Hydraulic pump 10 is fluidly connected to variable displacement hydraulic motor 11 through main fluid passages 13a and 13b so as to deliver fluid to hydraulic motor 11. As mentioned above, hydraulic servomechanism 2, neutral-position holding system 3 and load controlling system 4 controls the tilt angle of movable swash plate 10a of hydraulic pump 10. The pressure fluid supplied from charge fluid passage 16 to hydraulic servomechanism 2 is finally drained to fluid sump 56 in housing 12.

Load controlling system 4 for hydraulic pump 10 is supplied with fluid led from main fluid passage 13 through a load-controlling fluid passage 14, so as to slide spool 41 fitted in cylinder 40.

Hydraulic servomechanism 102, maximum swash plate angle holding system 103, load controlling system 104 and others are connected to hydraulic motor 11 so as to control the tilt of movable swash plate 11a, similar to those of hydraulic pump 10. Hydraulic motor 11 fluidly connected to hydraulic pump 10 through main fluid passages 13a and 13b is supplied with fluid delivered from hydraulic pump 10 so as to rotate cylinder block 11c and others, thereby rotating driven shaft 11b. Driven shaft 11b of hydraulic motor 11 is drivingly connected to a drive shaft for driving an axle and a drive shaft for driving a working device.

Load controlling system 104 for hydraulic motor 11 is supplied with fluid led from main fluid passage 13 through load-controlling fluid passage 14, so as to slide spool 141 fitted in cylinder 40.

The space in cylinder hole 42 of load controlling system 4 on a side of spool 41 opposite to pin 44, i.e., counter pressure chamber 42a of load controlling system 4, is connected through a counter pressure fluid passage 17 to the space in cylinder hole 142 of load controlling system 104 on a side of spool 141 opposite to pin 144, i.e., counter pressure chamber 142a of load controlling system 104.

Counter pressure fluid passage 17 is connected to charge fluid passage 16. A check valve 47 and a counter pressure valve (relief valve) 48 are interposed in parallel between counter pressure fluid passage 17 and charge fluid passage 16. More specifically, check valve 47 and counter pressure valve 48 are interposed in parallel between counter pressure fluid passage 17 and a fluid passage 18 branched from charge fluid passage 16 (see FIG. 3).

Due to this configuration, check valve 47 prevents fluid from backflowing from counter pressure fluid passage 17 to charge fluid passage 16. When hydraulic pressure in counter pressure fluid passage 17 exceeds a threshold value, counter pressure valve 48 is opened to release operating fluid from counter pressure fluid passage 17 to fluid passage 18 so as to regulate the amount of fluid.

In this way, check valve 47 and counter pressure valve 48 are interposed between charge fluid passage 16 and counter pressure fluid passage 17 connecting load controlling systems 4 and 104 to each other, thereby preventing hunting caused by pulsation of hydraulic pressure from charge fluid passage 16.

As mentioned above, HST 1 according to the invention comprises: hydraulic pump 10; hydraulic motor 11, wherein at least one of hydraulic pump 10 and motor 11 is variable in displacement, and provided with movable swash plate 10a or 11a; the closed circuit connecting hydraulic pump 10 and motor 11 to each other through main fluid passage 13; hydraulic servomechanism 2 or 102 for controlling a tilt angle of movable swash plate 10a or 11a of the at least one of hydraulic pump 10 and motor 11; pin 27 serving as the speed-controlling motive member attached to hydraulic servomechanism 2 or 102, wherein pin 27 interlocks with movable swash plate 10a or 11a and is moved by operating speed control operation lever 29; and load controlling system 4 or 104 attached to hydraulic servomechanism 2 or 102. Load controlling system 4 or 104 includes the actuator (including cylinder 40 and spool 41 or 141) for moving pin 27 in the direction for deceleration. Fluid is led from main fluid passage 13 to the actuator so as to serve as an element for detecting load and as hydraulic pressure fluid for actuating the actuator.

Main fluid passage 13 includes the pair of main fluid passages. One main fluid passage (referred to main fluid passage 13a) is higher-pressurized during forward traveling (so as to rotate hydraulic motor 11 for forward traveling), and the other main fluid passage (referred to main fluid passage 13b) is higher-pressurized during backward traveling (so as to rotate hydraulic motor 11 for backward traveling). A pair of check valves 58 are connected to the respective main fluid passages, so that fluid is led from either of the main fluid passages to the actuator through corresponding check valve 58 (see FIG. 11).

In this regard, as mentioned above, load controlling systems 4 and 104 are supplied with pressure fluid, serving as the load detection element and the operating fluid for the actuators of load controlling systems 4 and 104, from main fluid passage 13 through load-controlling fluid passage 14. More specifically, as shown in FIG. 11, one check valve 58 is provided on a fluid passage 14a branched from main fluid passage 13a to be higher-pressurized for forward traveling, and the other check valve 58 is provided on a fluid passage 14b branched from main fluid passage 13b to be higher-pressurized for backward traveling, so as to lead pressure fluid from either of main fluid passages 13a and 13b to load controlling systems 4 and 104.

Due to this structure, when HST 1 is set for forward traveling, load controlling fluid passage 14 leads pressure fluid from higher-pressurized main fluid passage 13a to load controlling systems 4 and 104 through check valve 58 on fluid passage 14a, so that load controlling system 4 and 104 use the variation of hydraulic pressure in main fluid passage 13a representing the variation of load on engine 15. On the other hand, when HST 1 is set for backward traveling, load controlling fluid passage 14 leads pressure fluid from higher-pressurized main fluid passage 13b to load controlling systems 4 and 104 through check valve 58 on fluid passage 14b, so that load controlling system 4 and 104 use the variation of hydraulic pressure in main fluid passage 13b representing the variation of load on engine 15.

In this way, load controlling systems 4 and 104 can perform the load control regardless of whether the vehicle travels forward or backward, because both of main fluid passage 13a to be higher-pressurized for forward traveling and main fluid passage 13b to be higher-pressurized for backward traveling are connected to load controlling fluid passage 14 connected to load controlling systems 4 and 104 so as to lead fluid from either of main fluid passages 13a and 13b to load controlling systems 4 and 104. Therefore, whether the vehicle travels forward or backward, the load control can be performed to prevent the engine from stalling, thereby enabling working vehicles and the like to work and travel smoothly.

Further, due to the pair of check valves 58 for leading pressure fluid from respective main fluid passages 13a and 13b to load controlling systems 4 and 104, pressure fluid is prevented from backflowing to main fluid passage 13a or 13b, and higher and lower pressurized main fluid passages 13 are prevented from being connected to each other. Therefore, the hydraulic pressure in main fluid passages 13 is kept stable, so as to keep the sufficient efficiency of HST 1, thereby accurately performing the load control.

Description will be given of neutral-check-relief valves 57 each of which is interposed between charge fluid passage 16 and each of main fluid passages 13a and 13b. When main fluid passages 13 are short of operating fluid, operating fluid is supplied from charge fluid passage 16 to lower-pressurized main fluid passage 13 (i.e., main fluid passage 13a or 13b) through corresponding neutral-check-relief valve 57.

When hydraulic pressure in main fluid passage 13 becomes higher than a threshold value (so as to require the load control), higher-pressurized neutral-check-relief valve 57 is opened to drain the operating fluid to charge fluid passage 16.

Further, neutral-check-relief valves 57 are configured to keep the neutral state of hydraulic pump 10 when the tilt angle of movable swash plate 10a is disposed adjacent to its neutral position. In other words, each neutral-check-relief valve 57 is a valve serving as the check valve for charged hydraulic pressure fluid to main fluid passage 13, combined integrally with a relief valve (neutral valve) for expanding the neutral zone.

Figure 3:
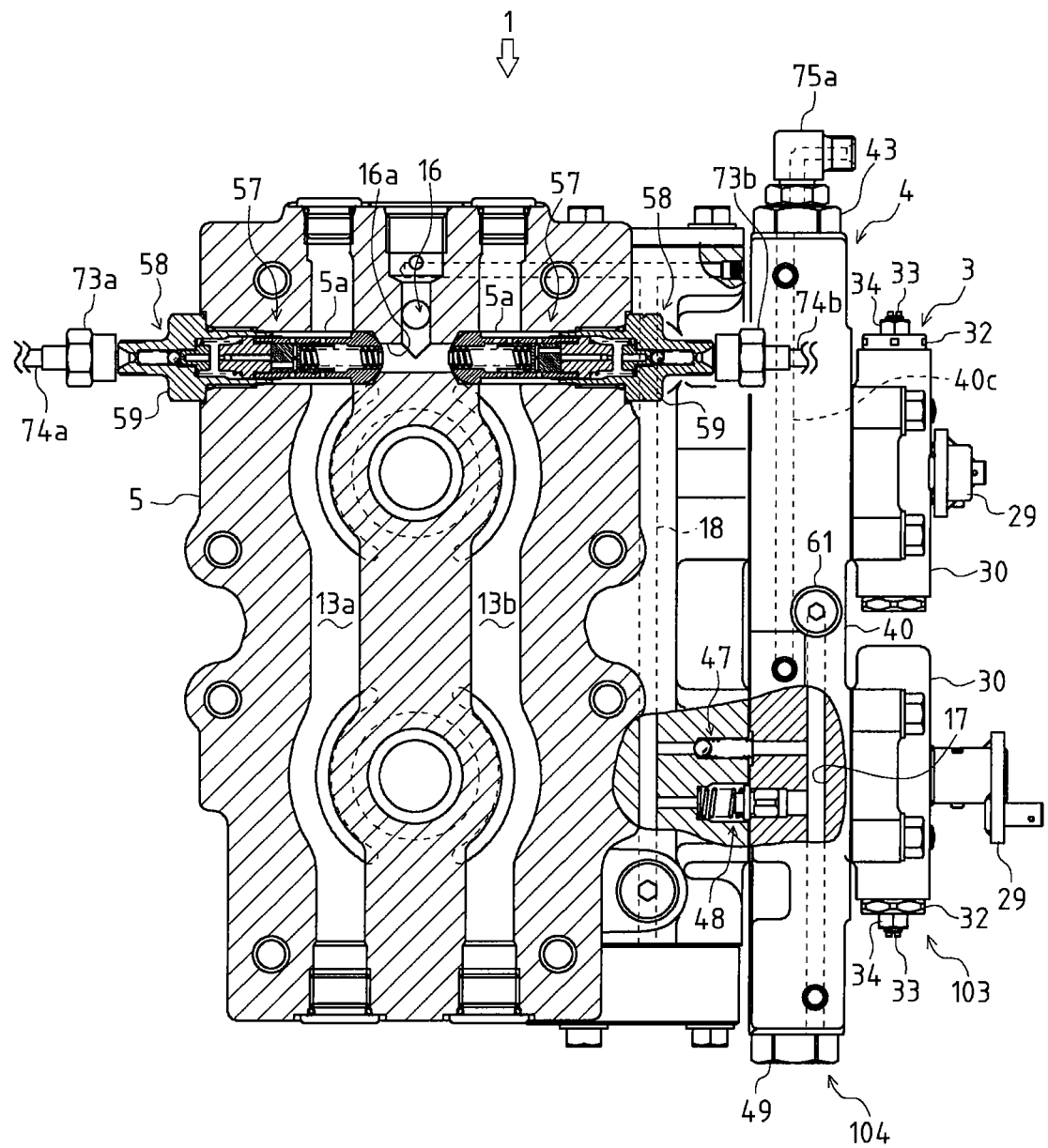
FIG. 3 is a rear view partly in section of the HST.

A concrete structure of neutral-check-relief valve 57 will be described. As shown in FIGS. 3 and 5, in duct plate 5, a substantially horizontal fluid passage 16a serving as charge fluid passage 16 is disposed between substantially parallel vertical main fluid passages 13a and 13b so as to be connected to main fluid passages 13a and 13b. Duct plate 5 is formed therein with left and right outwardly opened valve holes 5a, which are disposed on the lateral extension of fluid passage 16a and are connected to respective main fluid passages 13a and 13b. Plug members 59 are screwed into openings of respective valve holes 5a, so as to cover the openings. Neutral-check-relief valves 57 are configured in respective valve holes 5a. In other words, neutral-check-relief valves 57 are configured in respective valve holes 5a, each of which is formed in duct plate 5 between charge fluid passage 16 and each of main fluid passages 13a and 13b, so as to be disposed opposite to each other.

Figure 12:
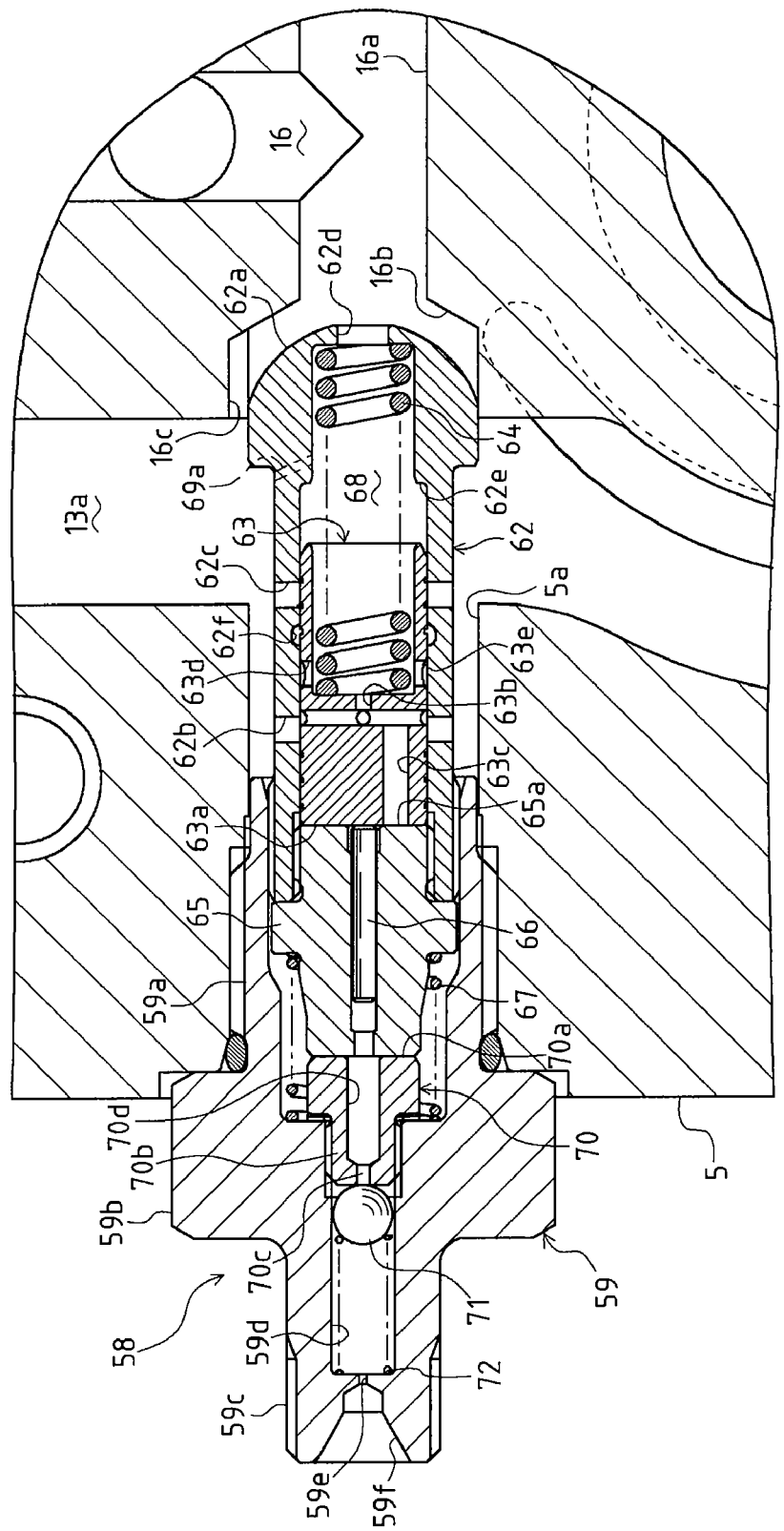
FIG. 12 is a sectional view of a structure of a neutral-check-relief valve.

Only one representative neutral-check-relief valve 57 (to main fluid passage 13a) will be described with reference to FIG. 12, because neutral-check-relief valves 57 have the common structure. Neutral-check-relief valve 57 comprises a valve body 62, a spool 63, a relief spring 64, a support piece 65, a feedback pin 66 and a check spring 67. Valve body 62 is slidably fitted in valve hole 5a. Spool 63 is slidably fitted in valve body 62. Relief spring 64 biases the slide of spool 63 in valve body 62. Support piece 65 is screwed and fitted onto an end portion of valve body 62 (toward plug member 59). Feedback pin 66 is slidably fitted in support piece 65. Check spring 67 biases valve body 62.

Substantially cylindrical valve body 62 has a valve portion 62a at one end portion thereof so as to open or close a connection portion of charge fluid passage 16 to main fluid passage 13. In this regard, a seat 16b shaped to fit valve portion 62a of valve body 62 is formed on the connection portion (end portion) of fluid passage 16a, serving as charge fluid passage 16, to be connected to main fluid passage 13. Due to the slide of valve body 62, valve portion 62a is fitted or separated onto and from seat 16b so as to open or close the connection portion of charge fluid passage 16 to main fluid passage 13.

Support piece 65 fitted onto valve body 62 so as to be integral with valve body 62 slidably in valve hole 5a. Check spring 67 biases valve body 62 having support piece 65 in the direction for fitting valve portion 62a onto seat 16a.

In this regard, plug member 59 closing the opening of vale hole 5a has a substantially cylindrical insertion portion 59a inserted into valve hole 5a. One side portion of valve body 62 having support piece 65 is inserted into insertion portion 59a. In insertion portion 59a, check spring 67 is interposed between plug member 59 and support piece 65, so as to bias valve body 62 through support piece 65 in the above-mentioned direction.

Substantially cylindrical spool 63 fitted in valve body 62 has a contact surface 63a to contact a contact surface 65a formed on a portion of support piece 65 in valve body 62. A spring chamber 68 is formed by spool 63 and the inner space of valve body 62 opposite to contact surface 63a of spool 63. Relief spring 64 is interposed between spool 63 and valve body 62 in spring chamber 68, so as to bias spool 63 in the direction for contact surfaces 63a to abut against contact surface 65a of support piece 65.

Feedback pin 66 slidably fitted in support piece 65 is adapted to slide so as to project outward from contact surface 65a of support piece 65, thereby sliding spool 63 against the biasing force of relief spring 64.

The pair of neutral-check-relief valves 57 having the above structure are disposed on opposite ends of fluid passage 16a serving as charge fluid passage 16 so as to face respective valve portions 62a of valve bodies 62 to each other.

The check valve (charge check valve) function of neutral-check-relief valve 57 will be described. Normally, valve portion 62a of valve body 62 is fitted onto seat 16b (i.e., valve portion 62a is closed) so as to separate charge fluid passage 16 from main fluid passage 13. When the hydraulic pressure in main fluid passage 13 is reduced because of lack of operating fluid therein, the hydraulic pressure in charge fluid passage 16 causes valve body 62 to slide against the force of check spring 67, so as to separate valve portion 62a from seat 16b (i.e., to open valve portion 62a), thereby connecting charge fluid passage 16 to main fluid passage 13, and thereby causing operating fluid to flow from charge fluid passage 16 to main fluid passage 13. A notch 16c is formed on an outer edge portion of seat 16b so as to connect charge fluid passage 16 to main fluid passage 13 when valve portion 62a is opened.

Due to the pair of neutral-check-relief valves 57, when the differential pressure between main fluid passages 13a and 13b is not less than a certain value, one main fluid passage 13 (higher-pressurized) is separated from charge fluid passage 16, and the other main fluid passage 13 (lower-pressurized) is connected to charge fluid passage 16.

Figure 13:
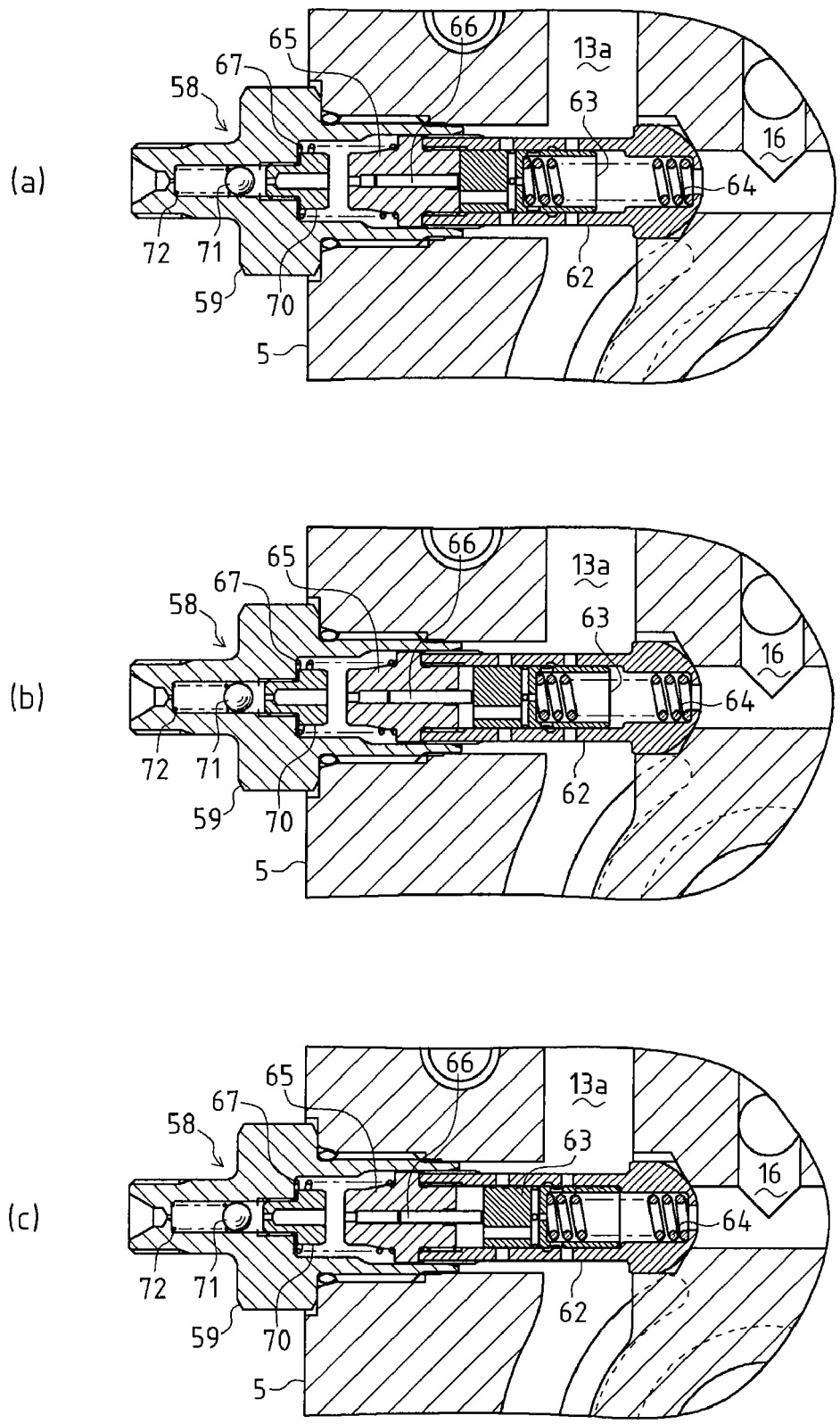
FIG. 13 is a view of movement of the neutral-check-relief valve.

More specifically, when the vehicle travels forward, main fluid passage 13a is higher-pressurized as mentioned above, and valve portion 62a of neutral-check-relief valve 57 for main fluid passage 13a is closed so as to separate main fluid passage 13a from charge fluid passage 16 (see FIG. 13). Simultaneously, neutral-check-relief valve 57 for lower-pressurized main fluid passage 13b is opened so as to connect main fluid passage 13b to charge fluid passage 16 (see FIG. 12).

Similarly, when the vehicle travels backward, higher-pressurized main fluid passage 13b is separated from charge fluid passage 16, and lower-pressurized main fluid passage 13a is connected to charge fluid passage 16.

The neutral valve function of neutral-check-relief valve 57 will be described. When movable swash plate 10a of hydraulic pump 10 is disposed adjacent to the neutral position and when the differential pressure between main fluid passages 13a and 13b is small, i.e., when the hydraulic pressure from main fluid passage 13 onto neutral-check-relief valve 57 is small, a little amount of operating fluid flows from main fluid passage 13 to charge fluid passage 16 so as to prevent hydraulic motor 11 from rotating, thereby keeping the neutral state of HST 1.

More specifically, when neutral-check-relief valve 57 is supplied with almost no hydraulic pressure, spool 63 contacts support piece 65 by the force of relief spring 64. In this state, a neutral port 62b formed in valve body 62 is connected to an orifice 63b formed in spool 63. Due to neutral port 62b and orifice 63b, the outer peripheral portion of valve body 62 opened to main fluid passage 13 is also opened into spring chamber 68 (see FIGS. 12 and 13(a)).

Valve portion 62a of valve body 62 is formed in a tip portion thereof with a connection port 62d, so that operating fluid flows out from main fluid passage 13 to charge fluid passage 16 through neutral port 62b, orifice 63b, spring chamber 68 and connection port 62d.

Orifice 63b restricts the flow of operating fluid drained to charge fluid passage 16, so as to cause a difference of hydraulic pressure in spring chamber 68 on one side of spool 63 from the hydraulic pressure (in main fluid passage 13) on the other side of spool 63 connected to neutral port 62b through a guide passage 63c formed in spool 63. Since the hydraulic pressure in spring chamber 68 becomes lower than the hydraulic pressure on the other side of spool 63, the differential pressure slides spool 63 toward spring chamber 68 against the force of relief spring 64.

In this regard, when the hydraulic pressure in main fluid passage 13 is increased from a nearly zero level, the flow of operating fluid is increased so as to increase the differential pressure for moving spool 63, thereby sliding spool 63 toward spring chamber 68.

Further, the hydraulic pressure in main fluid passage 13 is applied onto a rear end of feedback pin 66 (the left end in FIG. 12) so as to press spool 63 toward charge fluid passage 16 against the force of relief spring 64. Due to the pressure of feedback pin 66 and the differential pressure, spool 63 slides toward spring chamber 68. When the differential pressure and the pressure of feedback pin 66 are balanced with the biasing force of relief spring 64, spool 63 stops.

Afterward, when the hydraulic pressure in main fluid passage 13 reaches a predetermined value, spool 63 slides so as to separate neutral port 62b from orifice 63b, thereby cutting off the flow of fluid from main fluid passage 13 to charge fluid passage 16.

In this way, neutral port 62b and orifice 63b are connected to each other while the hydraulic pressure exists in the low-pressure range, i.e., before the hydraulic pressure increased from zero reaches the predetermined value. In this pressure range, even if movable swash plate 10a of hydraulic pump 10 slightly deviates from its neutral position, the neutral state of HST 1 is kept. In other words, in this low pressure range, relief port 62c is connected to orifice 63b so as to connect main fluid passage 13 to charge fluid passage 16, so that neutral-check-relief valve 57 functions as the neutral valve for expanding the neutral zone of HST 1.

The relief valve function for regulating the load controlling pressure will be described. When the pressure is increased from the low pressure range, spool 63 further slides toward spring chamber 16 (rightward in FIG. 12). In this regard, main fluid passage 13 is kept separate from charge fluid passage 16 during the increase process of hydraulic pressure after the separation of neutral port 62b from orifice 63b before relief port 62c formed in valve body 62 is connected to a relief port 63d formed in spool 63 (see FIG. 13(c)). In other words, a middle pressure range is defined as the pressure range, in which the pressure is increased higher than that in the low pressure range so as to separate neutral port 62b from orifice 63b, however, the pressure does not reach the level for connecting main fluid passage 13 to charge fluid passage 16 through relief port 62c and relief port 63d. In this pressure range, main fluid passage 13 is separated from charge fluid passage 16 so as to be prevented from draining fluid therefrom to charge fluid passage 16, thereby ensuring the full efficiency of the HST.

When the pressure is further increased into a predetermined high pressure range, as mentioned above, relief port 62c is connected to relief port 63d so as to connect main fluid passage 13 to charge fluid passage 16, thereby releasing operating fluid from main fluid passage 13 to charge fluid passage 16. In this regard, the slide of spool 63 due to the increased hydraulic pressure in main fluid passage 13 against the biasing force of spring 64 is limited by a step 62e formed on valve body 62 in spring chamber 68. In other words, spool 63 abuts against step 62e while the hydraulic pressure in main fluid passage 13 exists in the high pressure range defined as the range to perform the load control.

When load controlling system 4 or 104 controls load as mentioned above, the pair of neutral-check-relief valves 57 function as the relief valves because the increased hydraulic pressure in main fluid passage 13 exists in the high pressure range. In this regard, when the load control is performed, neutral-check-relief valve 57 between higher-pressurized main fluid passage 13 and charge fluid passage 16 has valve port 62a of valve body 62 closed, so as to slide spool 63 by the hydraulic pressure from main fluid passage 13 against the force of spring 64, thereby connecting relief port 62c of valve body 62 to relief port 63d of spool 63, i.e., functioning as the relief valve.

When the relief valve function is performed, neutral-check-relief valve 57 serves as a throttle (an orifice) 69 (see FIG. 11) for restricting the flow of fluid released from main fluid passage 13 to charge fluid passage 16. In this regard, the junction between relief ports 62c and 63d when spool 63 contacts step 62e is defined as throttle 69. When load controlling system 4 or 104 performs the load control, in HST 1, a part of pressure fluid flowing in higher-pressurized main fluid passage 13 is drained to lower-pressurized charge fluid passage 16 through throttle 69 (the junction between relief port 62c and relief port 63d).

In this regard, spool 63 is cut off slantwise so as to have a taper 63e on the outer peripheral portion of relief port 63d. A groove-shaped chamber 62f is formed on the inner peripheral surface of valve body 62 adjacent to relief port 62c. Chamber 62f is shaped so as to be connected to relief port 63d when relief port 63d is connected to relief port 62c. In other words, when relief port 63d is connected to relief port 62c, the operating fluid supplied from main fluid passage 13 into relief port 62c is guided into chamber 62f through taper 63e of relief port 63d. The flow of fluid is reversed in chamber 62f (due to the shape of chamber 62f), and then, fluid is introduced into spring chamber 68 through relief port 63d. Accordingly, the differential flow amount of fluid during the shift between the connection of relief port 63d to relief port 62c and the disconnection of relief port 63d from relief port 62c is prevented from causing hysteresis (the state of differential flow amount while keeping a constant pressure), thereby obtaining a fine relief characteristics.

In this way, during the load control, due to the draining of fluid through throttle 69 from higher-pressurized main fluid passage 13 to lower-pressurized (than the higher-pressurized main fluid passage 13) charge fluid passage 16, the hydraulic pressure in main fluid passage 13 is prevented from pulsating influentially on the load control, thereby improving the accuracy of load control.

More specifically, when higher-pressurized main fluid passage 13 is separated from lower-pressurized (than the higher-pressurized main fluid passage 13) charge fluid passage 16 during the load control, the flow of operating fluid from main fluid passage 13 to load controlling systems 4 and 104 becomes unstable and pulsates. The pulsation in main fluid passage 13 influences the accuracy of load controlling system 4 and 104 depending on the hydraulic pressure from main fluid passage 13. Therefore, as mentioned above, during the load control, pressure fluid is drained from higher-pressurized main fluid passage 13 to the lower-pressurized area through throttle 69 configured in neutral-check-relief valve 57 so as to prevent the pulsation in main fluid passage 13, thereby enabling HST 1 to perform accurate load control.

Alternatively, throttle 69 may be configured so as to constantly connect main fluid passage 13 to charge fluid passage 16 regardless of the slide position of spool 63 in valve body 62.

In this regard, a hole (such as a hole 69a in FIG. 12), serving as alternative throttle 69, is provided in a portion of valve body 62 free from the slide of spool 63. In this case, main fluid passage 13 is connected to charge fluid passage 16 through throttle 69 (69a) regardless of hydraulic pressure in main fluid passage 13. Therefore, when movable swash plate 10a of hydraulic pump 10 is disposed adjacent to the neutral position, and when the differential pressure between main fluid passages 13a and 13b is small, the neutral zone of HST 1 can be expanded. Further, during the load control, the fluid in main fluid passage 13 is prevented from pulsating influentially on the load control.

In this way, throttle 69 is configured so as to penetrate neutral-check-relief valve 57 having the charge check valve function for connecting and disconnecting main fluid passage 13 to and from charge fluid passage 16. In this regard, as mentioned above, in neutral-check-relief valve 57, throttle 69 is constituted by connecting relief port 63d to relief valve 62c, and formed in valve body 62 so as to be opened to spring chamber 68, thereby penetrating valve body 62 having valve portion 62a serving as the charge check valve.

Due to throttle 69 penetrating valve body 62 serving as the charge check valve, no additional throttle has to be formed in main fluid passage 13, for instance, thereby ensuring throttle 69 without increasing the number of parts. Further, since charge fluid passage 16 serves as the lower-pressurized area into which fluid is drained from higher-pressurized main fluid passage 13 through throttle 69, no additional means for supplying fluid is required to ensure the smooth load control.

Throttle 69 is closed before the hydraulic pressure in main fluid passage 13 is increased to the level requiring the load control with load controlling system 4 or 104. In this regard, as mentioned above, in the low pressure range where movable swash plate 10a of hydraulic pump 10 is disposed adjacent to the neutral position, spool 63 abuts at its contact surface 63a against contact surface 65a of support piece 65 so as to connect neutral port 62d to orifice 63b (see FIG. 13(a)). In this state, relief port 63d is disconnected from relief port 62c so as to close throttle 69.

When the hydraulic pressure in main fluid passage 13 is increased from the above condition into the middle pressure range, feedback pin 66 projects outward from contract surface 65a so as to move spool 63, thereby separating neutral port 62b from orifice 63b (see FIG. 13(b)). This state is maintained before the hydraulic pressure in main fluid passage 13 is increased into the high pressure range and relief port 63d is connected to relief port 62c so as to constitute throttle 69.

In this way, during the process of increasing the hydraulic pressure in higher-pressurized main fluid passage 13 after the separation of orifice 63b from neutral port 62b before relief port 63d is connected to relief port 62c so as to constitute throttle 69, this main fluid passage 13 is separated from charge fluid passage 16. In other words, throttle 69 is closed before the hydraulic pressure in higher-pressurized main fluid passage 13 is increased into the high pressure range, i.e., to the level requiring the load control with load controlling systems 4 and 104.

In this way, unless the load control is performed, throttle 69 is closed so as to enhance the volumetric efficiency of HST 1. In other words, during the load control, throttle 69 is made to prevent the pressure fluid in main fluid passage 13 from pulsating during the load control, and unless its hydraulic pressure level (not less than the neutral expansion level) reaches the level requiring the load control, throttle 69 is closed (i.e., relief port 63d is disconnected from relief port 62c) so as to prevent the pressure fluid in main fluid passage 13 from being drained to charge fluid passage 16. Therefore, the hydraulic pressure transmission efficiency from hydraulic pump 10 to hydraulic motor 11 through main fluid passage 13 is improved so as to improve the volumetric efficiency of HST 1.

The configuration of check valve 58 for leading pressure fluid from main fluid passage 13 to load controlling systems 4 and 104 will be described with reference to FIG. 12. Main fluid passages 13 are provided with respective check valves 58, which are disposed in plug members 59 constituting the relief valves (i.e., neutral-check-relief valves 57) for defining the maximum hydraulic pressure in respective main fluid passages 13a and 13b. Check valves 58 are configured so as to extract pressure fluid from respective plug members 59 and to lead the fluid to the above-mentioned actuators.

More specifically, main fluid passages 13a and 13b are provided with respective neutral-check-relief valves 57, having the relief valve functions, which are configured in respective valve holes 5a formed in duct plate 5 to be connected to respective main fluid passages 13. Plug members 59 constituting respective neutral-check-relief valves 57 are fitted into the outward openings of respective valve holes 5a. In each neutral-check-relief valve 57, plug member 59 has insertion portion 59a, into which the portion of valve body 62 with support piece 65 is inserted. Plug member 59 also serves as a plug retaining check spring 67 interposed between support piece 65 and plug member 59. Check valve 58 is configured in plug member 59 to extract pressure fluid from plug member 59 so as to lead the fluid to load controlling systems 4 and 104.

Plug member 59 is provided with a nut-shaped base portion 59b. Insertion portion 59a projects from one side of base portion 59b. A joint portion 59c projects from the other side of base portion 59b, and is threaded so as to have a joint screwed thereon, thereby connecting the joint to plug member 59.

Plug member 59 is bored therein with a valve hole 59d, which is extended in the projection direction of joint portion 59c from a bottom surface of plug member 59 in insertion portion 59a (onto which one end of check spring 67 is supported) to an intermediate portion of joint portion 59c through base portion 59b. A recess 59e is formed in a tip surface of joint portion 59c, and is connected to valve hole 59d through an orifice 59f. In other words, valve hole 59d is opened at the projecting portion of joint portion 59c to the outside through orifice 59f and recess 59e.

A valve seat member 70 is screwed into valve hole 59d on the side toward insertion portion 59a. Valve seat member 70 has a contact surface 70a adapted to abut against an end surface of support piece 65 opposite to contact surface 65a, and has an insertion portion 70b screwed into valve hole 59d. Further, valve seat member 70 is bored therein with a hole 70d, which is extended in the insertion direction of valve seat member 70 into valve hole 59a and is provided therein with a check port 70c. In this regard, valve seat member 70 is fixed to plug member 59 by screwing insertion portion 70b into the end portion of valve hole 59d, so as to connect the inner space of insertion portion 59d of plug member 59 (i.e., the inner space of valve hole 5a) to valve hole 59d through hole 70d. Hole 70d in valve seat member 70 is closed when contact surface 70a of valve seat member 70 abuts against support piece 65.

A valve ball 71, whose diameter is substantially as large as the hole diameter of valve hole 59d, is slidably fitted in valve hole 59d of plug member 59, and is biased by a check spring 72 so as to close check port 70c. Check spring 72 serves as an elastic member for defining the pressure required for opening check valve 58. In this regard, check port 70c and valve ball 71 are provided so that check port 70c is closed when valve ball 71 abuts against valve seat member 70. Check spring 72 is disposed in valve hole 59d opposite to check port 70c with respect to valve ball 71 so as to bias valve ball 71 in the above-mentioned direction.

Due to this configuration, the pressure fluid from higher-pressurized main fluid passage 13 is extracted through check valve 58 so as to be led from plug member 59 into load controlling systems 4 and 104. In this regard, when valve portion 62a of valve body 62 is closed by the force of check spring 67 so as to separate higher-pressurized main fluid passage 13 from charge fluid passage 16, valve seat member 70 is separated from support piece 65 so as to open hole 70d of valve seat member 70 at contact surface 70a (as shown in FIGS. 13 (a), (b) and (c)).

Pressure fluid in higher-pressurized main fluid passage 13 flows into insertion portion 59a of plug member 59 from the outside of valve body 62 and support piece 65. Check port 70c, which is a diametrically narrowed portion of hole 70d in valve seat member 70, increases hydraulic pressure of the pressure fluid flowing into insertion portion 59a, so as to push valve ball 71 by the increased hydraulic pressure against the biasing force of check spring 72, thereby connecting hole 70d to valve hole 59d. Therefore, the operating fluid flowing from main fluid passage 13 into valve hole 59d is extracted from plug member 59 through orifice 59f and recess 59e.

Due to this structure, pressure fluid in higher-pressurized main fluid passage 13 is led out from plug member 59 through check valve 58.

The pressure fluid extracted from plug member 59 is led into load controlling systems 4 and 104 through the following fluid passage structure. The fluid passage structure for leading fluid from respective main fluid passages 13a and 13b to load controlling systems 4 and 104 will be detailed with reference to FIGS. 4 to 6 and others.

Firstly, description will be given of the structure of fluid passage (fluid passage 14a) for leading fluid from main fluid passage 13a to be higher-pressurized for forward traveling to load controlling systems 4 and 104. As mentioned above, the pressure fluid in main fluid passage 13a is extracted from corresponding plug member 59 through corresponding check valve 58. A joint member 73a is screwed onto joint portion 59c of corresponding plug member 59, and a fluid pipe 74a is connected at one end thereof to joint member 73a. A joint member 75a is screwed into the top opening of joint member 43 of load controlling system 4 for hydraulic pump 10, and fluid pipe 74a is connected at the other end thereof to joint member 75a through a coupling member 76a. In this way, fluid passage 14a is constituted by joint member 73a, fluid pipe 74a, coupling member 76a, joint member 75a and so on, so as to lead the pressure fluid from main fluid passage 13a into fluid suction-and-delivery port 43a in load controlling system 4, thereby actuating load controlling system 4.

Further, a part of pressure fluid flowing into fluid suction-and-delivery port 43a is led out from fluid gallery 46 connected to fluid suction-and-delivery port 43a through fluid hole 43d, and introduced into fluid gallery 146 in load controlling system 104 for hydraulic motor 11 through fluid passage 40c, thereby actuating load controlling system 104.

Description will now be given of the structure of fluid passage (fluid passage 14b) for leading fluid from main fluid passage 13b to be higher-pressurized for backward traveling to load controlling systems 4 and 104. As mentioned above, the pressure fluid in main fluid passage 13b is extracted from corresponding plug member 59 through corresponding check valve 58. A joint member 73b is screwed onto joint portion 59c of corresponding plug member 59, and a fluid pipe 74b is connected at one end thereof to joint member 73b. A joint member 75b is screwed into a top opening of a fluid suction-and-delivery port 77 formed in cylinder 40 adjacent to fluid gallery 46, and fluid pipe 74b is connected at the other end thereof to joint member 75b through a coupling member 76b, as shown in FIG. 6. In this way, fluid passage 14b is constituted by joint member 73b, fluid pipe 74b, coupling member 76b, joint member 75b, fluid suction-and-delivery port 77, fluid passage 40d and so on, so as to lead the pressure fluid from main fluid passage 13b into fluid suction-and-delivery port 43a in load controlling system 4, thereby actuating load controlling system 4.

Further, as mentioned above, a part of pressure fluid flowing into fluid suction-and-delivery port 43a is introduced to load controlling system 104 through fluid gallery 46 and fluid passage 40c, thereby actuating load controlling system 104.

Figure 4:
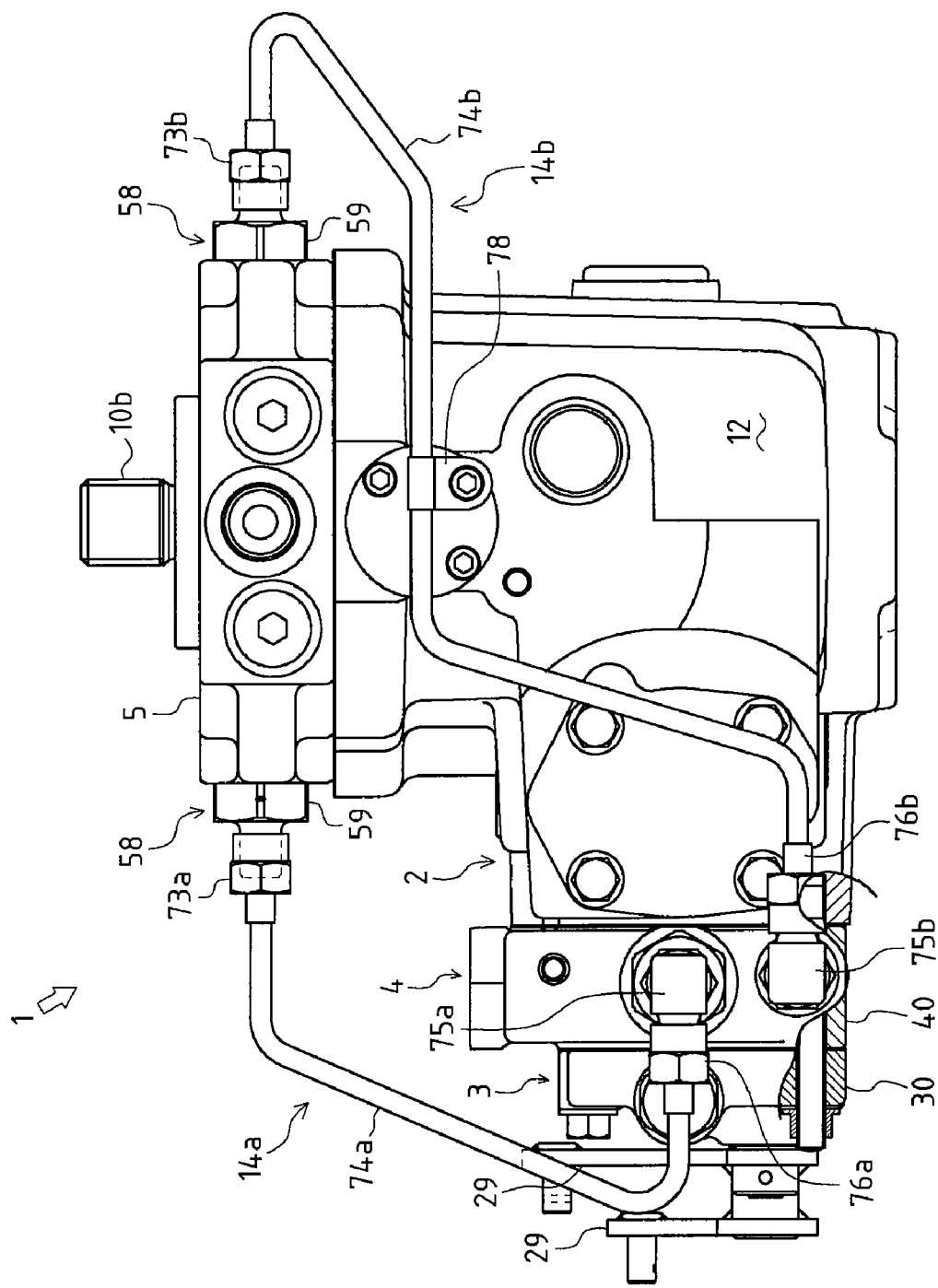
FIG. 4 is a plan view of the HST.

Fluid pipes 74a and 74b serving as fluid passages 14a and 14b are appropriately supported and fixed onto housing 12 or the like through support members 78, for example, as shown in FIGS. 1 and 4.

Due to the fluid passage structure, when main fluid passage 13a is higher-pressurized, the pressure fluid in main fluid passage 13a is extracted from plug member 59 of check valve 58 for main fluid passage 13a, and is introduced to load controlling systems 4 and 104 through fluid passage 14a. When main fluid passage 13b is higher-pressurized, the pressure fluid in main fluid passage 13b is extracted from plug member 59 of check valve 58 for main fluid passage 13b, and is introduced to load controlling systems 4 and 104 through fluid passage 14b.

To lead fluid from either of main fluid passages 13a and 13b to load controlling systems 4 and 104, due to such a simple and inexpensive structure having check valves 58 disposed in respective plug members 59 for extracting pressure fluid from the respective main fluid passages, the load control can be performed stably without reducing the efficiency of HST 1, and a space can be easily ensured so as to arrange the pipes prevented from interfering with each other.

In other words, plug members 59, constituting the relief valves (i.e., neutral-check-relief valves 57) for respective main fluid passages 13a and 13b, also serve as members constituting check valves 58. Therefore, to lead pressure fluid from main fluid passage 13 to load controlling systems 4 and 104, simple and inexpensive check valves 58 are configured so as to stably control load without reducing the efficiency of HST 1.

Further, a sufficient space for arranging the pipes prevented from interfering with each other is easily ensured for HST 1 because HST 1 requires no additional fluid extraction means for extracting fluid from duct plate 5 formed therein with main fluid passages 13 so as to lead the pressure fluid from main fluid passage 13 to load controlling systems 4 and 104. For example, in the present embodiment, plug members 59 project outward from opposite surfaces of duct plate 5 having main fluid passages 13 therein so as to facilitate piping for constituting fluid passages 14a and 14b to load controlling systems 4 and 104 without interference of pipes.

Figure 14:
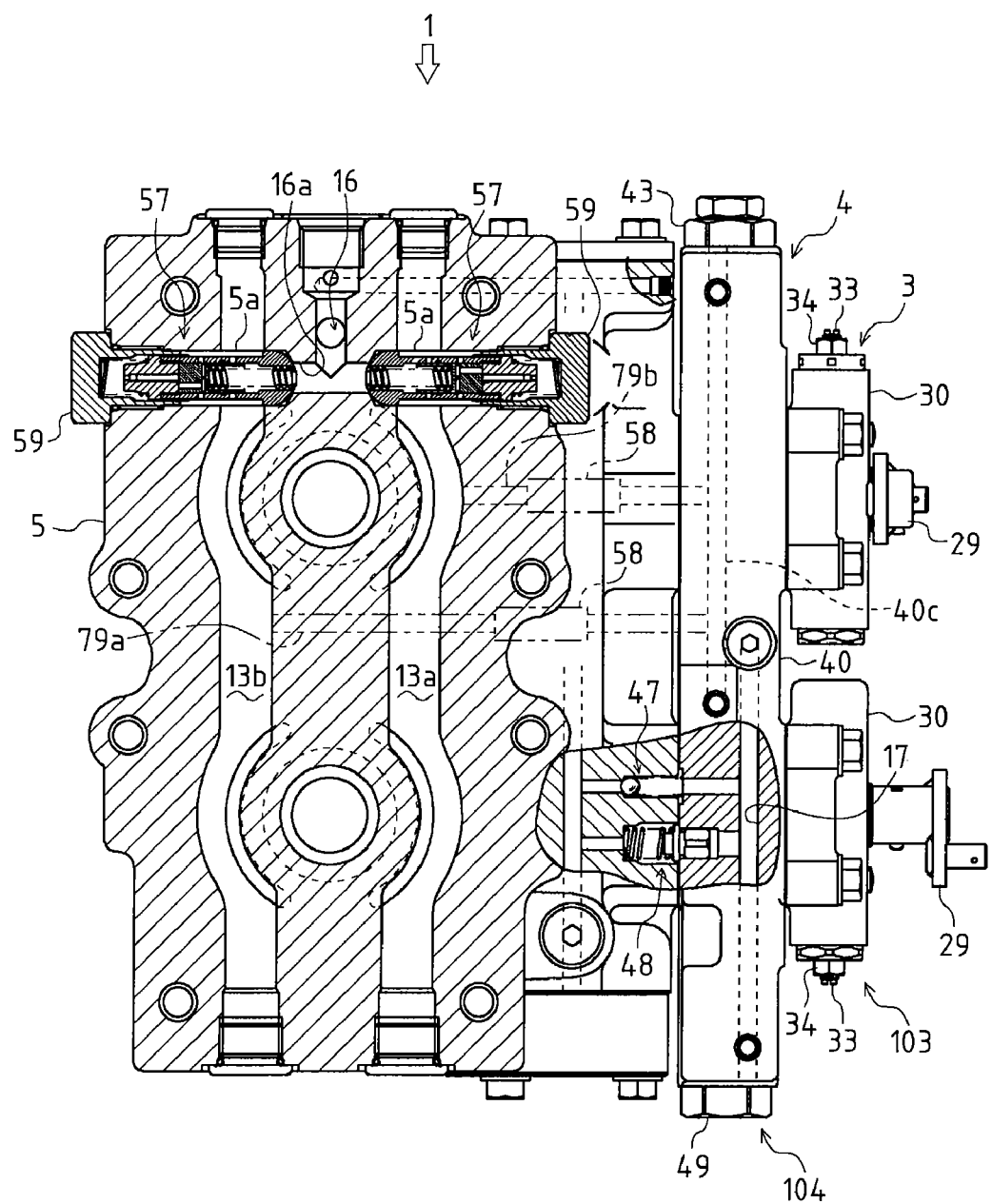
FIG. 14 is a rear view partly in section of a structure of another HST according to the invention.

Alternatively, fluid passages for leading pressure fluid in either of main fluid passages 13a and 13b to load controlling systems 4 and 104 can be configured within HST 1 with no external pipe. In this case, as shown in FIG. 14, a pair of fluid passages 79a and 79b are formed in duct plate 5 so as to be connected to respective main fluid passages 13a and 13b, and are connected to respective fluid galleries 46 and 146 (see FIG. 6) formed in cylinder 40 through respective fluid passages formed in housing 12 and cylinder 40. To constitute the pair of check valves 58, for example, a pair of plug members, similar to plug members 59, are fitted into openings of fluid passages 79a and 79b at an end surface of duct plate 5 faced into housing 12, and the check valves 58 are provided in the respective plug members so as to be disposed on the respective fluid passages connected to load controlling systems 4 and 104.

Due to this fluid passage structure formed within HST 1 with no external pipe, the pressure fluid in main fluid passage 13 can also be led to load controlling systems 4 and 104. In this case, no space for arranging a pipe outside of HST 1 is required, so as to simplify HST 1 in appearance.

The pressure required for opening check valve 58 interposed between main fluid passage 13a and load controlling systems 4 and 104 is different from the pressure required for opening check valve 58 interposed between main fluid passage 13b and load controlling systems 4 and 104. Due to the difference of pressures for opening respective check valves 58, the timing for starting the load control during forward traveling can be different from that during backward traveling, thereby easily adapted to an apparatus using HST 1, for example, an HMT, having different output torques (tractive efforts) of HST 1 at the same angle of the movable swash plate depending on whether the vehicle travels forward or backward. Consequently, the apparatus has a sufficient tractive effort regardless of whether the vehicle travels forward or backward.

In this regard, in the apparatus having different output torques of HST 1 for forward traveling and for backward traveling, if the pair of check valves 58 require the same pressure to be opened, the tractive effort caused by a tilt angle of the movable swash plate during one of forward traveling and backward traveling is smaller than the tractive effort caused by the same tilt angle of the movable swash plate during the other of forward traveling and backward traveling so as to insufficiently use the engine power. For example, the above-mentioned HMT has an output torque during backward traveling, which is smaller than the output torque during forward traveling. That is, the engine power is insufficiently used during backward traveling of the vehicle. Therefore, the pressures required for opening respective check valves 58 are made different from each other so as to apply the load control at different timings depending on whether the vehicle travels forward or backward. Consequently, the engine power is sufficiently used so as to obtain sufficient tractive effort regardless of whether the vehicle travels forward or backward.

The following structure is provided for making a difference between the pressures required for respective check valves 58. As mentioned above, check spring 72 serves as the elastic member for defining the pressure for opening check valve 58, which is interposed between either of main fluid passages 13a and 13b and load controlling systems 4 and 104. Check spring 72 may be provided to only one of check valves 58.

Check spring 72 is disposed on the downstream (secondary) side of corresponding check valve 58, so as to open check valve 58 when the pressure on the upstream (primary) side of check valve 58 exceeds a threshold value. To make a difference between the pressures required for respective check valves 58, there are a first manner providing check spring 72 to only one check valve 58, and a second manner providing a pair of check springs 72 to respective check valves 58.

If check spring 72 is provided to only one of check valves 58, check valve 58 provided with check spring 72 requires a pressure to be opened, which is higher than the pressure required for opening the other check valve 58 without check spring 72, because check valve 58 having check spring 72 has valve ball 71 biased by check spring 72. As the pressure required for opening check valve 58 is increased by check spring 72, the threshold hydraulic pressure in corresponding main fluid passage 13 for starting the load control is increased.

Therefore, if the apparatus such as the HMT has the tractive effort which becomes smaller during backward traveling, only main fluid passage 13b higher-pressurized for backward traveling is provided with check spring 72 so as to ensure the load control by sufficiently increased hydraulic pressure in main fluid passage 13, thereby effectively using the engine power and having a sufficient tractive effort during backward traveling of the vehicle.

If a pair of check springs 72 are provided to respective check valves 58, check springs 72 have different biasing forces (spring constants) so as to cause a difference of pressures required for opening respective check valves 58. In this case, check valve 58 provided with check spring 72 having the larger biasing force requires a pressure to be opened, which is higher than the pressure required for opening the other check valve 58 with check spring 72 having the smaller biasing force, so as to have a larger threshold hydraulic pressure in corresponding main fluid passage 13 for starting the load control.

Since check spring 72 for defining a pressure required for opening check valve 58 is provided to at least one of check valves 58 so as to cause a difference of pressures required for opening respective check valves 58, the threshold hydraulic pressure in higher-pressurized main fluid passage 13 for starting the load control can be easily determined.

Further, in HST 1, load controlling systems 4 and 104 are provided with respective throttles, which are disposed adjacent to respective counter pressure chambers 42a and 142a receiving pressure fluid for pressing respective spools 41 against the hydraulic pressure of fluid from main fluid passage 13 so as to be connected to respective counter pressure chambers 42a and 142a. As shown in FIG. 11, an orifice 61 serves as the throttle disposed adjacent to counter pressure chamber 42a in load controlling system 4 for hydraulic pump 10. Slow-return valve 60 serves as the throttle disposed adjacent to counter pressure chamber 142a in load controlling system 104 for hydraulic motor 11.

Counter pressure fluid passage 17 is formed in cylinder 40 so as to be connected to counter pressure chamber 42a of load controlling system 4, and orifice 61 is formed in a bolt-shaped member embedded into cylinder 40 on counter pressure fluid passage 17, so as to control the amount of fluid sucked and drained to and from counter pressure chamber 42a.

Slow-return valve 60 is configured in bolt member 49 screwed into the open end of cylinder hole 142 as mentioned above, so as to be interposed between counter pressure chamber 142a and counter pressure fluid passage 17. Slow-return valve 60 serves as a check valve for checking the flow of fluid from counter pressure chamber 42a to counter pressure fluid passage 17. Slow-return valve 60 also serves as an orifice for limiting the flow amount of fluid drained from counter pressure chamber 142a to counter pressure fluid passage 17. Slow-return valve 60 has the following structure.

Figure 15:
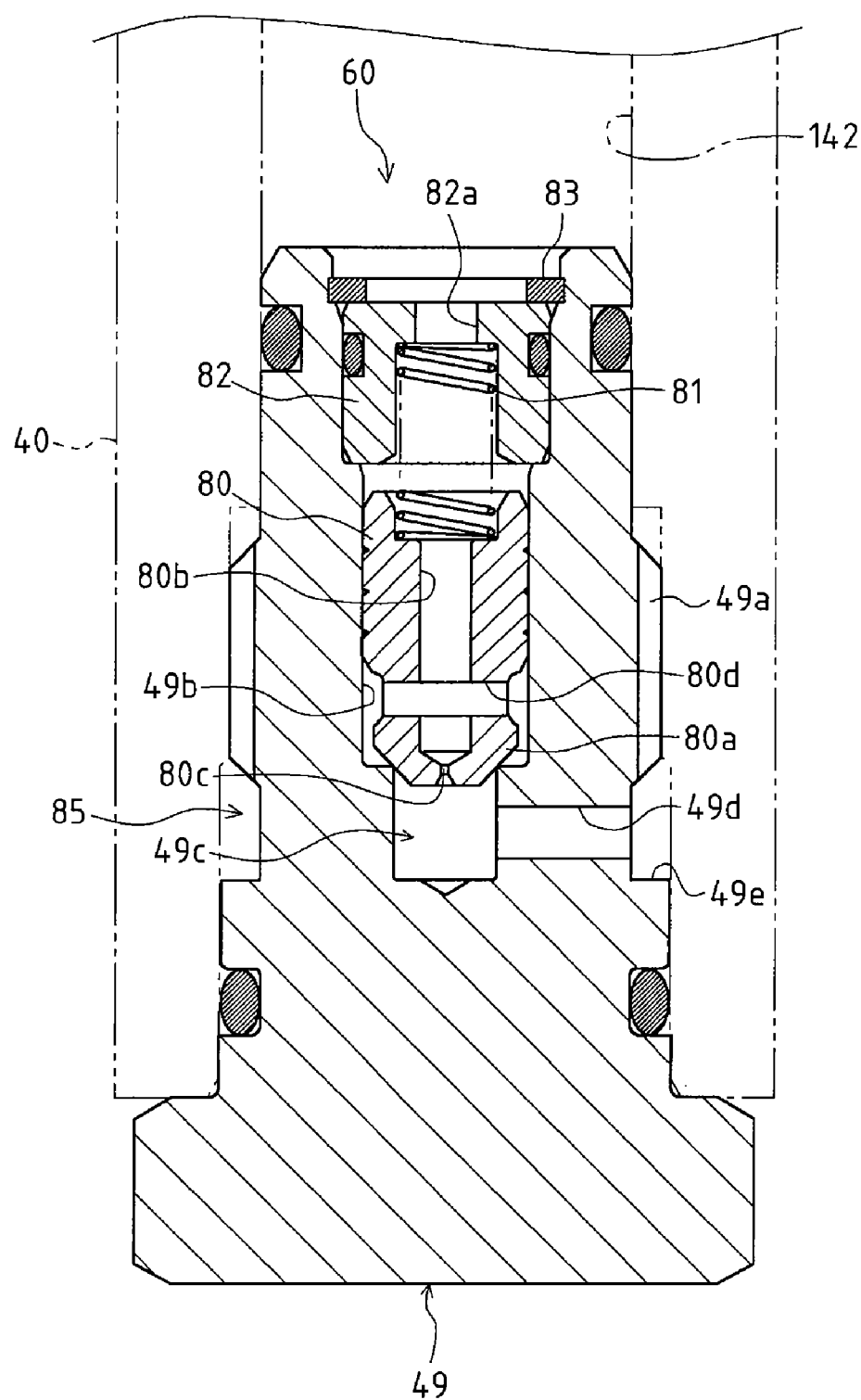
FIG. 15 is a sectional view of a structure of a slow-return valve.

In this regard, as shown in FIG. 15, bolt member 49 is peripherally formed with a threaded portion 49a at its substantially middle portion in the insertion direction thereof. Bolt member 49 is fixed into cylinder hole 142 by threaded portion 49a fitted to a tapped portion formed in cylinder hole 142. A valve hole 49b is opened at a tip of bolt member 49. Valve hole 49b is diametrically narrowed at a bottom portion thereof so as to have a fluid suction-and-delivery port 49c, which is connected to counter pressure fluid passage 17 through a fluid passage 49d formed in bolt member 49.

A groove 49e is formed on an outer peripheral portion of bolt member 49. A fluid gallery 85 is formed between groove 49e and cylinder hole 142 of cylinder 40, so as to be connected to counter pressure fluid passage 17. In this way, fluid passage 49d is opened to fluid gallery 85.

A spool 80 is slidably fitted at a tip thereof into valve hole 49b. Spool 80 is a substantially cylindrical member extended in the slide direction thereof, and the tip portion of spool 80 is formed into a valve portion 80a for opening and closing fluid suction-and-delivery port 49c according to the slide of spool 80. When valve portion 80a abuts against a seat surface formed on a step between valve hole 49b and fluid suction-and-delivery port 49c (i.e., the opening of fluid suction-and-delivery port 49c), fluid suction-and-delivery port 49c is closed (i.e., fluid suction-and-delivery port 49c is separated from valve hole 49b).

Spool 80 is provided with a spring 81 abutting against a rear end thereof, so as to be biased in the direction for closing fluid suction-and-delivery port 49c. A base 82 is fitted into the opening of valve hole 49b and is retained by a circlip 83, so as to receive spring 81. Namely, spring 81 is interposed between a back end of spool 80 and base 82 so as to press spool 80.

Spool 80 is formed therein with a fluid passage hole 80b extended in the slide direction thereof and opened to the back end thereof. Fluid passage hole 80b is connected to orifice 80c opened at a head of valve portion 80a of spool 80. Spool 80 is also formed therein with a sidewardly opened connection hole 80d connected to fluid passage hole 80b. Namely, the inner space of fluid passage hole 80b is connected to valve hole 49b through connection hole 80d. Base 82 is formed therein with a hole 82a connecting valve hole 49b to counter pressure chamber 142a.

Figure 16:
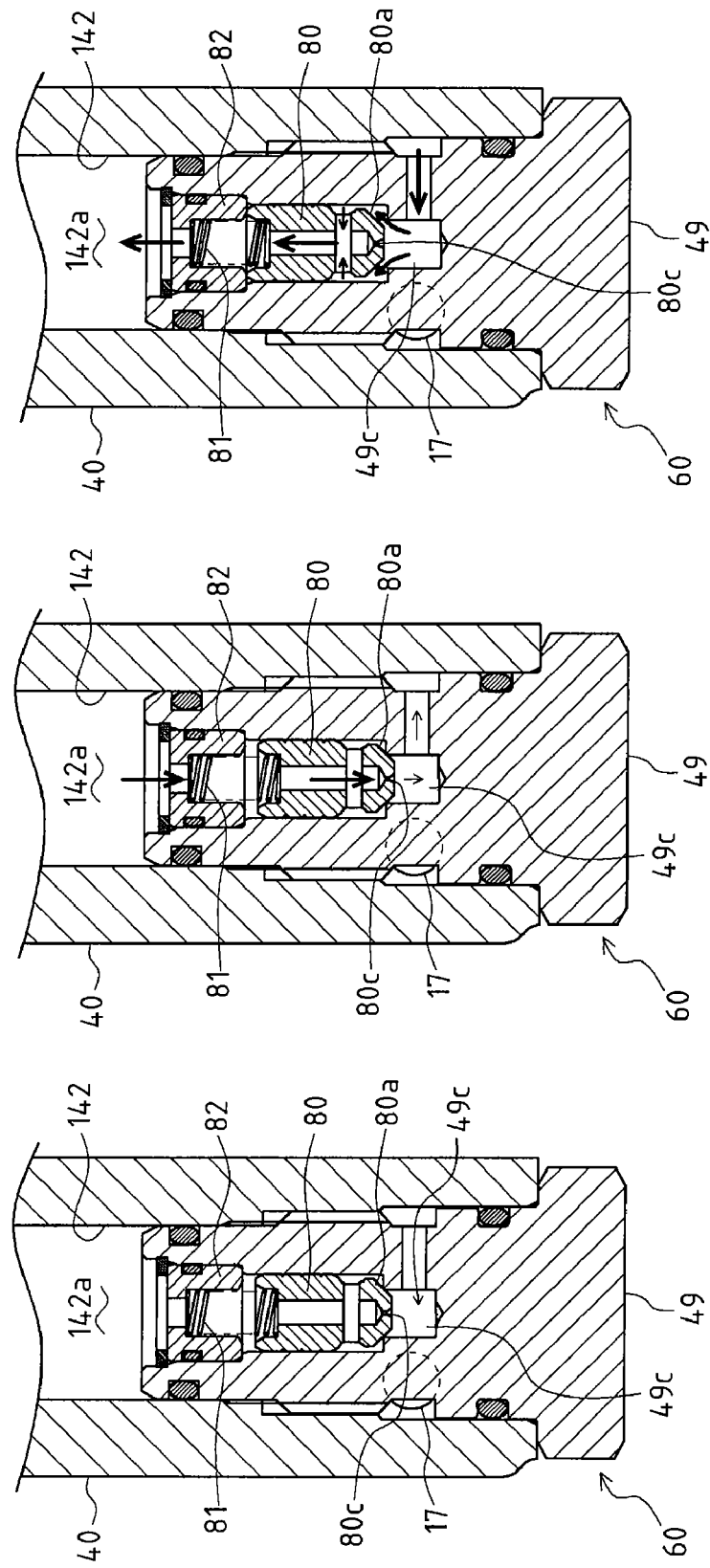
FIG. 16 is a view of movement of the slow-return valve.

A motion of slow-return valve 60 having the above structure will be described with reference to FIG. 16. As shown in FIG. 16(a), when the primary side (toward counter pressure fluid passage 17) and the secondary side (toward counter pressure chamber 42a) of slow-return valve 60 have no pressure difference (in the natural state), no operating fluid flows between counter pressure chamber 142a and counter pressure fluid passage 17, so that valve portion 80a of spool 80 biased by spring 81 abuts against the seat surface of fluid suction-and-delivery port 49c so as to close fluid suction-and-delivery port 49c.

As shown in FIG. 16(b), when the hydraulic pressure in counter pressure chamber 142a is higher than the hydraulic pressure in counter pressure fluid passage 17, the differential hydraulic pressure and the biasing force of spring 81 press spool 80 so as to close fluid suction-and-delivery port 49c. In this state, the operating fluid is drained from counter pressure chamber 142a to counter pressure fluid passage 17 through orifice 80c formed in spool 80. Orifice 80c limits the flow amount of fluid to counter pressure fluid passage 17.

As shown in FIG. 16(c), when the hydraulic pressure in counter pressure chamber 142a is lower than the hydraulic pressure in counter pressure fluid passage 17, and when the differential hydraulic pressure for sliding spool 80 exceeds the biasing force of spring 81 onto spool 80, spool 80 slides against the biasing force of spring 81 so as to open fluid suction-and-delivery port 49c (to separate valve portion 80a from the seat surface), thereby flowing the operating fluid from counter pressure fluid passage 17 to counter pressure chamber 142a through fluid suction-and-delivery port 49c and valve hole 49b. In this state, orifice 80c is prevented from limiting the flow amount of fluid.

In this way, load controlling systems 4 and 104 are provided with respective throttles, i.e., orifice 61 and slow-return valve 60, disposed adjacent to respective counter pressure chambers 42a and 142a, so as to have sufficient counter pressure effects, respectively. Therefore, load controlling systems 4 and 104 are prevented from hunting, thereby smoothening and stabilizing their load controls.

In brief, during the load control by load controlling system 4 for hydraulic pump 10, spool 41 is slid by pin 44 so as to drain operating fluid from counter pressure chamber 42a to counter pressure fluid passage 17. Due to the restriction of flow amount of drained fluid through orifice 61, the hydraulic pressure in counter pressure chamber 42a is increased, and is added to the pressure of spring 45 serving as the counter pressure against the hydraulic pressure from main fluid passage 13, so as to moderate the slide of spool 41 for deceleration, thereby preventing load controlling system 4 from suddenly performing the load control.

On the other hand, during the load control by load controlling system 104 for hydraulic motor 11, spool 141 is slid by pin 144 so as to drain operating fluid from counter pressure chamber 142a to counter pressure fluid passage 17. Due to the restriction of flow amount of drained fluid by orifice 80c of slow-return valve 60, the hydraulic pressure in counter pressure chamber 142a is increased so as to moderate the slide of spool 141 for deceleration, and thereby preventing load controlling system 104 from suddenly performing the load control.

Especially, in the present embodiment, slow-return valve 60 is provided for controlling the counter pressure in load controlling system 104 for hydraulic motor 11, in consideration that load controlling system 104 is actuated when the traveling speed of the working vehicle exists in the middle-and-high speed range where even a little change of tilt angle of the movable swash plate influences on the traveling speed.

Load controlling system 104 for hydraulic motor 11 is further provided with the following structure for smoothening the load control. As shown in FIG. 10, in load controlling system 104 for hydraulic motor 11, at an engagement position of spool 141 and pin 27 serving as the speed-controlling motive member, a space s is provided between spool 141 and pin 27 when pin 27 is disposed at the maximum speed position.

More specifically, as mentioned above, the engagement position of spool 131 and pin 27 is referred to as the position where notched portion 141b of penetrating hole 141a in spool 141 is adapted to engage with large diameter portion 27c of pin 27. At the engagement position, when pin 27 is disposed at the maximum speed position (when movable swash plate 11a of hydraulic motor 11 is disposed at the neutral position), large diameter portion 27c is disposed closest to notched portion 141b of spool 141 slid for deceleration.

With respect to pin 27 in this state (drawn in phantom lines in FIG. 10), large diameter portion 27c of pin 27 has space s (at the top end thereof) from notched portion 141b of spool 141. Space s defines the slide stroke of spool 141 during the load control after the slide start of spool 141 until spool 141 comes to engage with pin 27.

Due to space s in the engagement position of spool 141 and pin 27, spool 141 pressed by pin 144 by the hydraulic pressure increased in main fluid passage 13 slides to a certain degree (defined by space s) before it is engaged with pin 27, thereby moderating the slide of spool 141 for the load control, and thereby smoothening and stabilizing the load control.

In this regard, with respect to load controlling system 104 for hydraulic motor 11, due to slow-return valve 60 as mentioned above, the hydraulic pressure in counter pressure chamber 142a is increased according to the slide of spool 141 for deceleration so as to moderate the motion of spool 141. In this state, due to the space defining the slide degree of spool 141 for engaging with pin 27, the motion of spool 141 is further moderated before spool 141 engages with pin 27.

Further, load controlling system 104 for hydraulic motor 11 is provided with the following structure for smoothening the load control. As shown in FIG. 10, spool 141 is provided thereon with an O-ring 84 serving as a seal member for keeping the fluid tightness between spool 141 and cylinder 40. More specifically, O-ring 84 is fitted into an annular groove formed on spool 141 at an end portion of spool 141 toward counter pressure chamber 142a. Therefore, spool 141 is hermetically fitted at O-ring 84 thereon to the inner peripheral wall of cylinder hole 142 of cylinder 40, so as to keep its fluid tightness against counter pressure chamber 142a of spool 141.

Due to O-ring 84 serving as the seal member on spool 141, when spool 141 slides for deceleration, the operating fluid can be led from counter pressure chamber 142a to slow-return valve 60 without leaking, so as to improve the counter pressure effect of slow-return valve 60, thereby surely moderating the motion of spool 141 during the load control, and thereby smoothening and stabilizing the load control.

Figure 11:
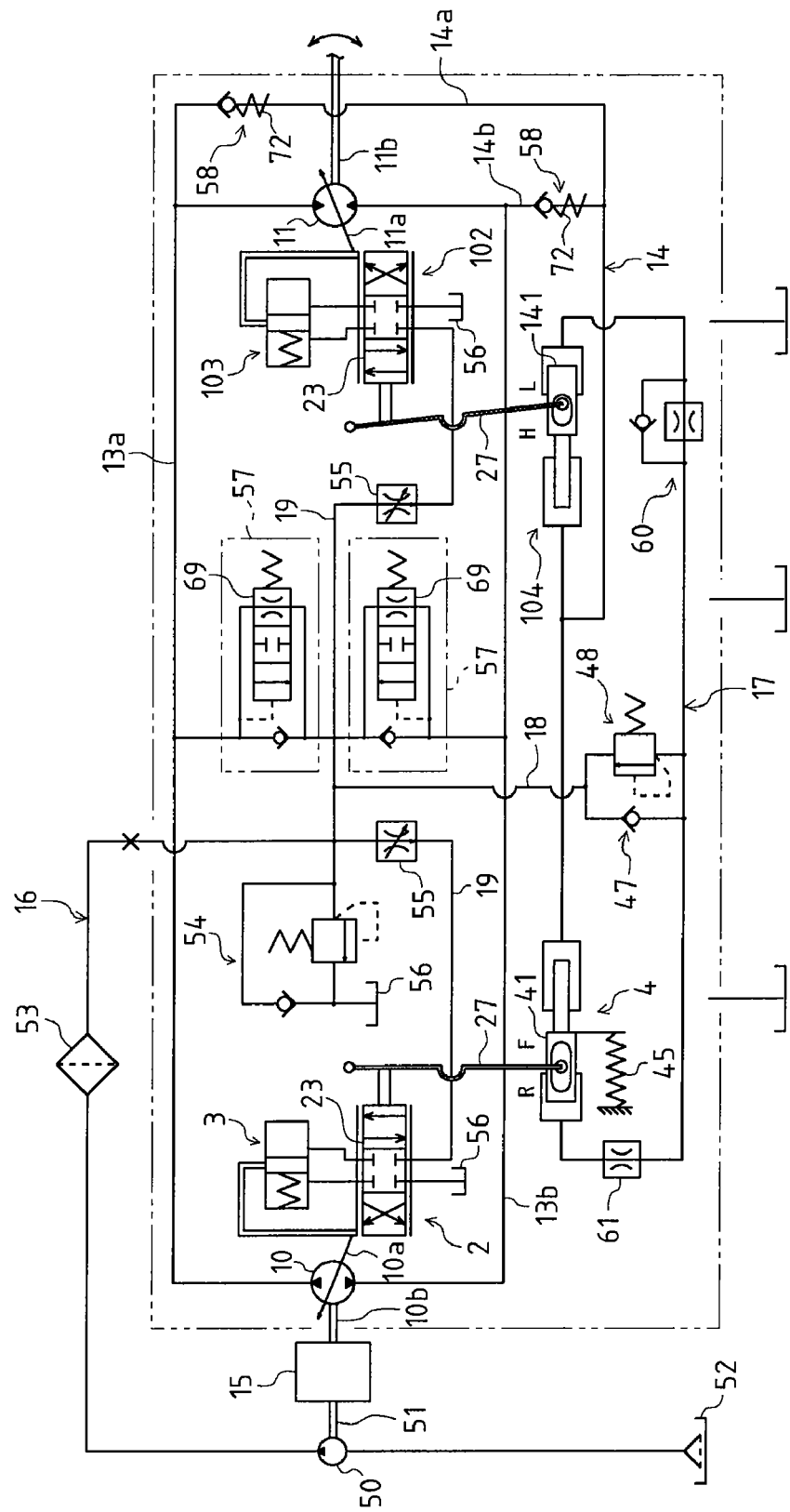
FIG. 11 is a hydraulic circuit diagram of the HST according to the invention.

Further, as shown in FIG. 11, HST 1 is provided with a pair of flow-determining valves 55 for limiting respective flow amounts of fluid to the respective movable swash plate angle control valves in respective hydraulic servomechanisms 2 and 102. A pair of fluid passages 19 are provided for introducing charged hydraulic pressure from charge fluid passage 16 to hydraulic servomechanism 2 for hydraulic pump 10 and hydraulic servomechanism 102 for hydraulic motor 11, respectively. The pair of flow-determining valves 55 are disposed on portions of respective fluid passages 19, where flow-determining valves 55 are prevented from restricting the charged hydraulic pressures supplied as the counter pressures for respective load controlling systems 4 and 104.

In other words, the pair of fluid passages 19 are branched from charge fluid passage 16 to respective hydraulic servomechanisms 2 and 102, and are provided thereon with respective flow-determining valves 55, each of which limits the flow amount of pressure fluid supplied from charge fluid passage 16 through fluid passage 19 to swash plate angle control valve 23 in each of hydraulic servomechanism 2 and 102 independently of the limitation of flow amount by the other flow-determining valve 55.

In fluid passages 19 branched from charge fluid passage 16 to respective hydraulic servomechanisms 2 and 102, the portions of fluid passages 19 having respective flow-determining valves 55 thereon are disposed at positions, where flow-determining valves 55 are prevented from restricting the charged hydraulic pressures supplied as the counter pressures for respective load controlling systems 4 and 104. In other words, the positions of flow-determining valves 55 are determined so as to prevent flow-determining valves 55 disposed thereon from restricting the flow amount of charged hydraulic pressure fluid in fluid passage 18 which is branched from charge fluid passage 16 and is bifurcated into counter pressure fluid passages 17 to respective load controlling systems 4 and 104 (see FIG. 11).

As shown in FIG. 5, each bolt member 90 is screwed into a hole 12b formed in an end portion of housing 12 of HST 1 so as to be embedded into housing 12, and each flow-determining valve 55 is configured in bolt member 90 so as to limit the flow amount of operating fluid introduced from charge fluid passage 16 into piston 21 (cylinder chamber 24) of each of hydraulic servomechanisms 2 and 102 through fluid passage 19. In other words, the operating fluid from charge fluid passage 16 flowing in fluid passage 19 is restricted in amount by flow-determining valve 55, and then, it is introduced into cylinder chamber 24 in each of hydraulic servomechanisms 2 and 102 through a fluid passage 21b connected to hole 12b.

Figure 17:
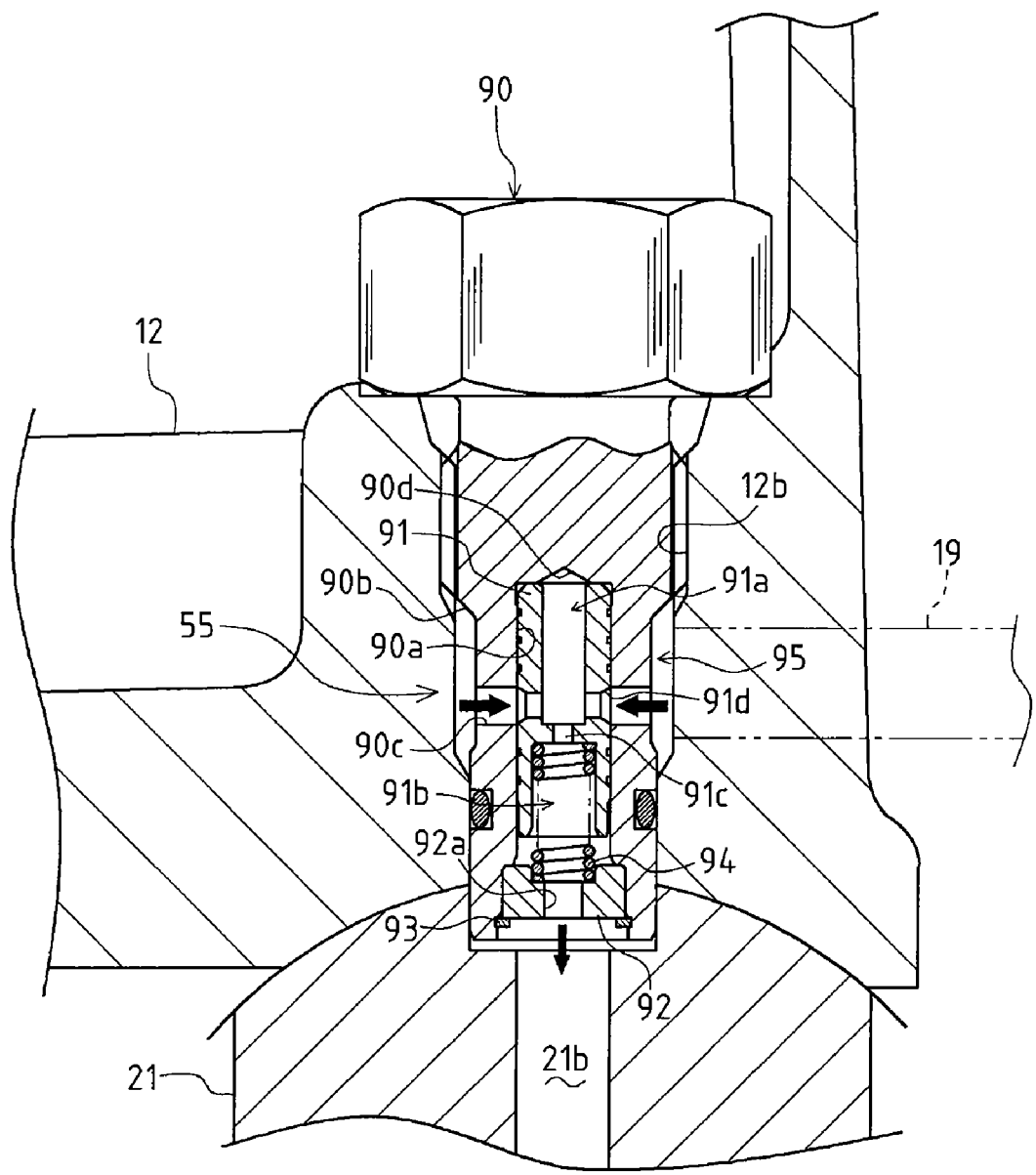
FIG. 17 is a sectional view of a flow-determining valve.

As shown in FIG. 17, bolt member 90 is formed therein with a valve hole 90a opened at a tip thereof in the insertion direction thereof. A cylindrical spool 91 is slidably fitted in valve hole 90a. A spring retainer 92 is fixed into an opening of valve hole 90a and is retained by a circlip 93. A spring 94 is interposed between spool 91 and spring retainer 92 so as to press spool 91. Spring retainer 92 is formed therein with a connection hole 92a, so that valve hole 90a is connected to fluid passage 21b through spring retainer 92.

A groove 90b is formed on an outer peripheral portion of bolt member 90 so as to serve as a fluid gallery 95 between bolt member 90 and hole 12b. Fluid gallery 95 is connected to fluid passage 19. Fluid gallery 95 is opened into valve hole 90a through a side hole 90c formed in bolt member 90.

Spool 92 fitted in valve hole 90a is formed with a fluid suction-and-delivery port 91a which is a hole opened at the inner (top in FIG. 17) side of valve hole 90a. Spool 91 is formed therein on the side toward spring 94 with a spring chamber 91b for receiving spring 94. Spool 91 is formed in an intermediate portion thereof in the slide direction thereof with an orifice 91c, through which fluid suction-and-delivery port 91a is connected to spring chamber 91b. Spool 91 is formed therein with a connection hole 91d having the substantially same diameter as that of side hole 90c, and fluid suction-and-delivery port 91a is opened sidewise from spool 91 through connection hole 91d.

When spool 91 comes to abut against the bottom surface of valve hole 90a by the biasing force of spool 91, connection hole 91d of spool 91 is coaxially connected to side hole 90c of bolt member 90. Namely, the open area between connection hole 91d and side hole 90c becomes the maximum when spool 91 pressed by spring 94 abuts against the bottom surface of valve hole 90a. A recessed fluid gallery 90d is formed on the bottom surface of valve hole 90a.

Due to this structure, when spool 91 abuts against the bottom surface of valve hole 90a, the charged pressure fluid in fluid passage 19 from charge fluid passage 16 flows into fluid suction-and-delivery port 91a through fluid gallery 95, side hole 90c and connection hole 91d. The pressure fluid in fluid suction-and-delivery port 91a flows to spring chamber 91b (the secondary side) through orifice 91c, and flows into fluid passage 21b in piston 21 through connection hole 92a in spring retainer 92.

Due to the limitation of fluid flow by orifice 91c, hydraulic pressure on the primary side (the portion of valve hole 90a inward from orifice 91c) is increased while hydraulic pressure on the secondary side is reduced. The increased hydraulic pressure causes spool 91 to slide toward spring retainer 92 (downward in FIG. 17) against spring 94. Due to this slide of spool 91, the open area between connection hole 91d and side hole 90c is reduced so as to reduce the amount of charged pressure fluid flowing from fluid gallery 95 into valve hole 90a through side hole 90c, thereby reducing the hydraulic pressure on the primary side of flow-determining valve 55. When the hydraulic pressure on the secondary side exceeds the hydraulic pressure on the primary side, spool 91 slides inward in valve hole 90a.

In other words, when the amount of charged pressure fluid flowing into flow-determining valve 55 is increased to exceed a certain value, spool 91 slides so as to reduce the open area between side hole 90c in bolt member 90 and connection hole 91d in spool 91, thereby reducing the flow amount of charged pressure fluid. On the contrary, when the flow amount is reduced less than the certain value, the open area is increased. In this way, flow-determining valve 55 serves as a variable orifice.

Since the pair of fluid passages 19 leading the charged pressure fluid to respective hydraulic servomechanisms 2 and 102 are provided with respective flow-determining valves 55, hydraulic servomechanisms 2 and 102 stably control the respective movable swash plates, and load controlling systems 4 and 104 accurately control load.

Namely, due to flow-determining valves 55, the amounts of fluid flows led to respective hydraulic servomechanisms 2 and 102 are limited so as to moderate the motions of hydraulic servomechanisms 2 and 102, and to stabilize the hydraulic pressures supplied to respective swash plate angle control valves 23 without pulsation, thereby stabilizing the control by hydraulic servomechanisms 2 and 102.

Further, since the flows of charged pressure fluid supplied as the counter pressures of respective load controlling systems 4 and 104 are free from the flow restriction by flow-determining valves 55, load controlling systems 4 and 104 obtain respective sufficient counter pressures against the hydraulic pressures from main fluid passage 13 so as to accurately control load.

It is further understood by those skilled in the art that the foregoing description is a preferred embodiment of the disclosed apparatus and that various changes and modifications may be made in the invention without departing from the scope thereof claimed as follows.

What is claimed is:

1. A hydrostatic stepless transmission comprising:
   a hydraulic pump;
   a hydraulic motor, wherein at least one of the hydraulic pump and motor is variable in displacement, and is provided with a movable swash plate;
   a closed circuit connecting the hydraulic pump and motor to each other through a pair of main fluid passages, wherein one main fluid passage is higher-pressurized during forward traveling, and wherein the other main fluid passage is higher-pressurized during backward traveling;
   a hydraulic servomechanism for controlling a tilt angle of the movable swash plate of the at least one of the hydraulic pump and motor;
   a speed-controlling motive member attached to the hydraulic servomechanism, wherein the speed-controlling motive member interlocks with the movable swash plate and is moved by operating a speed control operation lever; and
   a load controlling system attached to the hydraulic servomechanism, the load controlling system including
   an actuator for moving the speed-controlling motive member in a direction for deceleration, and
   a pair of check valves connected to the respective main fluid passages, wherein fluid is led from either of the main fluid passages to the actuator through the corresponding check valve so as to serve as an element for detecting load and as hydraulic pressure fluid for actuating the actuator,
   wherein pressures required for opening the respective check valves are different from each other.

2. The hydrostatic transaxle according to claim 1, wherein at least one of the check valves is provided with an elastic member for determining the pressure required for opening the corresponding check valve.

3. A hydrostatic stepless transmission comprising: a hydraulic pump;
   a hydraulic motor, wherein at least one of the hydraulic pump and motor is variable in displacement, and is provided with a movable swash plate;
   a closed circuit connecting the hydraulic pump and motor to each other through a pair of main fluid passages, wherein one main fluid passage is higher-pressurized during forward traveling, and wherein the other main fluid passage is higher-pressurized during backward traveling;
   a pair of plugs serving as a pair of relief valves for determining respective maximum pressures in the respective main fluid passages;

a hydraulic servomechanism for controlling a tilt angle of the movable swash plate of the at least one of the hydraulic pump and motor;

a speed-controlling motive member attached to the hydraulic servomechanism, wherein the speed-controlling motive member interlocks with the movable swash plate and is moved by operating a speed control operation lever; and a load controlling system attached to the speed-controlling motive member, the load controlling system including an actuator for moving the speed-controlling motive member in a direction for deceleration, and a pair of check valves disposed within the respective plugs so as to be connected to the respective main fluid passages, wherein fluid is led from either of the main fluid passages to the actuator through the corresponding check valve so as to serve as an element for detecting load and as hydraulic pressure fluid for actuating the actuator.

4. A hydrostatic stepless transmission comprising:

a hydraulic pump;

a hydraulic motor, wherein at least one of the hydraulic pump and motor is variable in displacement, and is provided with a movable swash plate;

a closed circuit including a main fluid passage so as to connect the hydraulic pump and motor to each other;

a hydraulic servomechanism for controlling a tilt angle of the movable swash plate of the at least one of the hydraulic pump and motor;

a speed-controlling motive member attached to the hydraulic servomechanism, wherein the speed-controlling motive member interlocks with the movable swash plate and is moved by operating a speed control operation lever; and a load controlling system attached to the hydraulic servomechanism, the load controlling system including an actuator comprising a cylinder and a spool for moving the speed-controlling motive member in a direction for deceleration, wherein fluid is led from the main fluid passage to the actuator so as to serve as an element for detecting load and as hydraulic pressure fluid for actuating the actuator, wherein the spool is slidably fitted in the cylinder and engaging with the speed-controlling motive member, wherein the cylinder is fluidly connected therein on one side of the spool to the main fluid passage, so that, when the load control is required, the spool is pushed by hydraulic pressure fluid from the main fluid passage so as to move the speed-controlling motive member, thereby controlling a tilt angle of the movable swash plate independently of the tilt angle control of the movable swash plate by operating the speed controlling operation lever, a counter pressure chamber disposed in the cylinder on the other side of the spool so as to be supplied with hydraulic pressure fluid for pressing the spool against the hydraulic pressure fluid from the main fluid passage, and a throttle disposed adjacent to the counter pressure chamber and opened to the counter pressure chamber.

5. The hydrostatic stepless transmission according to claim 4, wherein, at a position where the spool of the load controlling system for the hydraulic motor is adapted to engage with the speed-controlling motive member, unless the spool is slid in the direction for deceleration, the spool has a space from the speed-controlling motive member disposed at a position for establishing a maximum speed.

6. The hydrostatic stepless transmission according to claim 5, wherein the spool is provided with a seal for holding fluid tightness between the spool and the cylinder.

7. A hydrostatic stepless transmission comprising:

variable displacement hydraulic pump and motor provided with respective movable swash plates;

a closed circuit including a main fluid passage so as to connect the hydraulic pump and motor to each other;

a charge fluid passage;

hydraulic servomechanisms for controlling tilt angles of the movable swash plates of the respective hydraulic pump and motor, the hydraulic servomechanisms including respective swash plate angle control valves;

speed-controlling motive members attached to the respective hydraulic servomechanisms, wherein each of the speed-controlling motive members interlocks with the corresponding movable swash plate and is moved by operating a speed control operation lever;

load controlling systems attached to the respective hydraulic servomechanisms, each of the load controlling systems including an actuator for moving the speed-controlling motive member in a direction for deceleration, wherein fluid is led from either of the main fluid passages to the actuator so as to serve as an element for detecting load and as hydraulic pressure fluid for actuating the actuator;

a second fluid passage for leading charged pressure fluid from the charge fluid passage to the hydraulic servomechanisms for the respective hydraulic pump and motor; and flow-determining valves for limiting flow amounts of fluid to the respective swash plate angle control valves of the hydraulic servomechanisms, wherein the flow-determining valves are disposed on portions of the second fluid passage where the flow-determining valves are prevented from limiting the amounts of charged pressure fluid supplied to counter pressure chambers of the load controlling systems.

8. A hydrostatic stepless transmission comprising:

a hydraulic pump;

a hydraulic motor, wherein at least one of the hydraulic pump and motor is variable in displacement, and is provided with a movable swash plate;

a closed circuit connecting the hydraulic pump and motor to each other through a pair of main fluid passages, wherein one main fluid passage is higher-pressurized during forward traveling, and wherein the other main fluid passage is higher-pressurized during backward traveling;

a hydraulic servomechanism for controlling a tilt angle of the movable swash plate of the at least one of the hydraulic pump and motor;

a speed-controlling motive member attached to the hydraulic servomechanism, wherein the speed-controlling motive member interlocks with the movable swash plate and is moved by operating a speed control operation lever;

a load controlling system attached to the hydraulic servomechanism, the load controlling system including an actuator for moving the speed-controlling motive member in a direction for deceleration, wherein fluid is led from either of the main fluid passages to the actuator so as to serve as an element for detecting load and as hydraulic pressure fluid for actuating the actuator;

a pair of charge check valves, each charge check valve being interposed between a charge fluid passage and one of the respective main fluid passages; and a pair of throttles, wherein each throttle penetrates one of the respective charge check valves, wherein a part of pressure fluid flowing in the higher-pressurized main fluid passage in the closed circuit is drained through the throttle of the respective charge check valve to the charge fluid passage pressurized lower than the higher-pressurized main fluid passage during the load control by the load controlling system, wherein each charge check valve has first and second valve members penetrated by the respective throttle, the throttle being formed by a first relief port formed in the first valve member and a second relief port formed in the second valve member, wherein the second valve member is slidably disposed within the first valve member to selectively open or close the throttle, wherein the throttle is opened when the second valve member slides within the first valve member to fluidly connect the second relief port with the first relief port so as to fluidly connect the higher-pressurized main fluid passage to the charge fluid passage, and wherein the throttle is closed when the second valve member slides within the first valve member to fluidly disconnect the second relief port from the first relief port, wherein the throttle is closed before hydraulic pressure in the main fluid passage is increased to a level requiring the load control by the load controlling system, and wherein the throttle is opened when the hydraulic pressure in the main fluid passage is increased to a level requiring the load control by the load controlling system.

9. The hydrostatic stepless transmission according to claim 8, further comprising:

a pair of check valves, each check valve configured integrally with one of the respective charge check valves, wherein the check valve is adapted to be opened to release the fluid from the corresponding main fluid passage to the actuator, and wherein the check valve is closed unless the hydraulic pressure in the corresponding main fluid passage reaches the level requiring the load control by the load controlling system, wherein each charge check valve has a third valve member movable in association with the opening and closing of the check valve, wherein the movement of the third valve member slides the second valve member within the first valve member to thereby selectively open or close the throttle.

10. The hydrostatic stepless transmission according to claim 8, wherein the first and second relief ports open in a direction perpendicular to a direction in which the second valve member slides within the first valve member.

* * * * *